(12) United States Patent
Zhao et al.

(10) Patent No.: US 12,375,348 B2
(45) Date of Patent: Jul. 29, 2025

(54) METHOD AND APPARATUS FOR DEVICE CONFIGURATION PARAMETER PROCESSING, METHOD AND APPARATUS FOR DATA ANALYSIS, COMPUTING DEVICE, COMPUTER-READABLE STORAGE MEDIUM AND COMPUTER PROGRAM PRODUCT

(71) Applicants: Beijing BOE Technology Development Co., Ltd., Beijing (CN); BOE TECHNOLOGY GROUP CO., LTD., Beijing (CN)

(72) Inventors: Junjie Zhao, Beijing (CN); Hongxiang Shen, Beijing (CN); Yaoping Wang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 18/258,634

(22) PCT Filed: Dec. 23, 2021

(86) PCT No.: PCT/CN2021/140929
§ 371 (c)(1),
(2) Date: Jun. 21, 2023

(87) PCT Pub. No.: WO2022/135539
PCT Pub. Date: Jun. 30, 2022

(65) Prior Publication Data
US 2024/0048441 A1 Feb. 8, 2024

(30) Foreign Application Priority Data
Dec. 25, 2020 (CN) .................. 202011565492.0

(51) Int. Cl.
*H04L 41/0816* (2022.01)
*G05B 19/418* (2006.01)
(Continued)

(52) U.S. Cl.
CPC .... *H04L 41/0816* (2013.01); *G05B 19/41875* (2013.01); *G06T 7/0004* (2013.01);
(Continued)

(58) Field of Classification Search
CPC ............. H04L 41/0816; H04L 41/0823; H04L 41/0866; H04L 41/0886; H04L 41/16;
(Continued)

(56) References Cited

U.S. PATENT DOCUMENTS 8,903,993 B2 * 12/2014 LeGendre ........... G06F 11/3428
709/224
9,887,879 B2 * 2/2018 Nagashima ......... H04L 41/0866
(Continued)

*Primary Examiner* — Alex Tran
(74) *Attorney, Agent, or Firm* — Myers Bigel, P.A.

(57) ABSTRACT

The present application discloses a method and apparatus for device configuration parameter processing, a method and apparatus for data analysis, a computing device, a computer-readable storage medium and a computer program product. The method for device configuration parameter processing includes: acquiring collection data of a collection device located at a target position, wherein the collection data is configured to be input into a content analysis model for the target position so as to obtain a content analysis result of the collection data, determining, based on the collection data, whether a current configuration parameter of the collection device has changed, sending, in response to the current configuration parameter of the collection device having changed, a preset configuration parameter for the target position to the collection device so as to adjust the current configuration parameter of the collection device based on the preset configuration parameter.

14 Claims, 13 Drawing Sheets

(51) Int. Cl.
  *G06T 7/00* (2017.01)
  *H04L 41/08* (2022.01)
  *H04L 41/0823* (2022.01)
  *H04L 41/0866* (2022.01)

(52) U.S. Cl.
  CPC ...... *H04L 41/0823* (2013.01); *H04L 41/0866* (2013.01); *H04L 41/0886* (2013.01)

(58) Field of Classification Search
  CPC .............. H04L 41/0806; H04L 41/082; H04L 41/0803; H04L 41/085; H04L 41/0859; H04L 41/0853; G05B 19/41875; G06T 7/0004; G06T 2207/20084
  See application file for complete search history.

(56) References Cited

U.S. PATENT DOCUMENTS

| | | | |
|---|---|---|---|
| 10,680,889 B2 * | 6/2020 | Vasseur | G06N 20/10 |
| 11,043,008 B2 * | 6/2021 | Koyama | G06T 7/85 |
| 11,115,288 B2 * | 9/2021 | Zhu | H04L 41/082 |
| 11,360,197 B2 * | 6/2022 | Sutavani | G01S 17/89 |
| 11,409,697 B2 * | 8/2022 | Kunchakarra | G06F 16/182 |
| 11,504,552 B2 * | 11/2022 | Mead | H04N 13/204 |
| 11,916,739 B2 * | 2/2024 | Cuomo, Jr. | H04L 41/0866 |
| 12,072,432 B2 * | 8/2024 | Han | G01S 7/003 |
| 2015/0046123 A1 * | 2/2015 | Kato | G06F 11/079 |
| | | | 702/183 |
| 2017/0138781 A1 * | 5/2017 | Adibhatla | F02C 9/263 |
| 2019/0258807 A1 * | 8/2019 | DiMaggio | G06F 21/577 |
| 2022/0188733 A1 * | 6/2022 | Wang | G06Q 10/10 |

* cited by examiner

METHOD AND APPARATUS FOR DEVICE CONFIGURATION PARAMETER PROCESSING, METHOD AND APPARATUS FOR DATA ANALYSIS, COMPUTING DEVICE, COMPUTER-READABLE STORAGE MEDIUM AND COMPUTER PROGRAM PRODUCT

RELATED APPLICATION

The present application is a 35 U.S.C. 371 national stage application of PCT International Application No. PCT/CN2021/140929 filed on Dec. 23, 2021, which claims the priority of Chinese patent application No. 202011565492.0 filed on Dec. 25, 2020, the entire disclosures of each are incorporated herein by reference.

FIELD

This disclosure generally relates to the technical field of data processing based on artificial intelligence, and in particular to a method and apparatus for device configuration parameter processing, a method and apparatus for data analysis, a computing device, a computer-readable storage medium and a computer program product.

BACKGROUND

With the development of the Internet of Things (IoT) and artificial intelligence (AI) technology, AI analyzes data provided by IoT devices through deep learning and other technologies, thereby mining the data values.

The application of IoT and AI technology in the manufacturing industry can improve the production efficiency of the manufacturing industry considerably. Given the particularity of manufacturing processes, it may be necessary to collect a large number of monitoring images for each manufacturing process so as to conduct process quality testing. Devices for collecting the monitoring images and AI algorithm models for performing intelligence analysis on the monitoring images are key factors for ensuring the quality testing results. Changes in these key factors will lead to reduced testing efficiency.

SUMMARY

According to one aspect of the present application, a method for device configuration parameter processing is provided. The method comprises: acquiring collection data of a collection device located at a target position, wherein the collection data is configured to be input into a content analysis model for the target position so as to obtain a content analysis result of the collection data; determining, based on the collection data, whether a current configuration parameter of the collection device has changed; sending, in response to the current configuration parameter of the collection device having changed, a preset configuration parameter for the target position to the collection device so as to adjust the current configuration parameter of the collection device based on the preset configuration parameter; wherein when the input into the content analysis model is collection data of the collection device configured with the preset configuration parameter, the content analysis result output by the content analysis model has a first content analysis accuracy rate, and when the input into the content analysis model is collection data of the collection device configured with the current configuration parameter, the content analysis result output by the content analysis model has a second content analysis accuracy rate, wherein the first content analysis accuracy rate is higher than the second content analysis accuracy rate.

In some embodiments, determining, based on the collection data, whether a current configuration parameter of the collection device has changed comprises: comparing a same data index of the collection data and historical collection data to obtain a first comparison result, wherein the historical collection data is data acquired for the target position at a historical time temporally earlier than the data collection time, and the data index is an index of the collection data varying with a configuration parameter of the collection device; and determining, based on the first comparison result, whether a current configuration parameter of the collection device has changed.

In some embodiments, determining, based on the collection data, whether a current configuration parameter of the collection device has changed comprises: comparing a same data index of the collection data and training data of the content analysis model to obtain a second comparison result, wherein the training data is data for training the content analysis model, and the data index is an index of the collection data varying with a configuration parameter of the collection device; and determining, based on the second comparison result, whether a current configuration parameter of the collection device has changed.

In some embodiments, the collection data comprises a current device identifier of the collection device, and determining, based on the collection data, whether a current configuration parameter of the collection device has changed comprises: identifying a device identifier of the collection device from the collection data; and determining, based on the device identifier of the collection data and a historical device identifier of the target position, whether a current configuration parameter of the collection device has changed.

In some embodiments, the method further comprises: after acquiring the collection data of the collection device located at the target position, performing data format conversion on the collection data.

In some embodiments, determining, based on the collection data, whether a current configuration parameter of the collection device has changed comprises: inputting the collection data into a configuration parameter categorization model to obtain a current configuration parameter category of the collection device; determining whether the current configuration parameter category of the collection device is a preset configuration parameter category; determining, in response to the current configuration parameter category of the collection device not being the preset configuration parameter category, that the current configuration parameter of the collection device has changed. Moreover, sending a preset configuration parameter for the target position to the collection device comprises: sending a preset configuration parameter corresponding to the preset configuration parameter category to the collection device.

In some embodiments, the method further comprises: acquiring first historical collection data for the target position and a configuration parameter category of the collection device collecting the first historical collection data; and performing model training using the first historical collection data as a sample and the configuration parameter category of the collection device collecting the first historical collection data as a label so as to obtain the configuration parameter categorization model.

In some embodiments, the method further comprises: after acquiring the configuration parameter category of the collection device collecting the first historical collection data, inputting the configuration parameter category of the collection device collecting the first historical collection data into a configuration parameter category aggregation model to obtain an aggregated configuration parameter category; and performing model training using the first historical collection data as a sample and the configuration parameter category of the collection device collecting the first historical collection data as a label comprises: performing model training using the first historical collection data as a sample and the aggregated configuration parameter category as a label so as to obtain the configuration parameter categorization model.

In some embodiments, the method further comprises: acquiring second historical collection data for the target position, a configuration parameter category of the collection device collecting the second historical collection data, and a target content result of the second historical collection data, the target content result being objective content reflected by the second historical collection data; inputting the second historical collection data corresponding to each configuration parameter category into the content analysis model to obtain a content analysis result of the second historical collection data corresponding to each configuration parameter category; determining a content analysis accuracy rate of the content analysis model for the second historical collection data of each configuration parameter category based on the content analysis result and the target content result of the second historical collection data corresponding to each configuration parameter category; and determining the configuration parameter category corresponding to the highest content analysis accuracy rate as the preset configuration parameter category.

In some embodiments, the method further comprises: acquiring third historical collection data for the target position and a target content result of the third historical collection data, the target content result being objective content reflected by the third historical collection data; and performing model training using the third historical collection data as a sample and the target content result of the third historical collection data as a label so as to obtain the content analysis model.

In some embodiments, the method is performed by an edge device comprising a rule engine service component and a device remote control service component, and determining, based on the collection data, whether a current configuration parameter of the collection device has changed is performed by the rule engine service component, and sending a preset configuration parameter for the target position to the collection device is performed by the device remote control service component.

In some embodiments, the method is performed by an edge device and a platform server, and determining, based on the collection data, whether a current configuration parameter of the collection device has changed is performed by the edge device and sending a preset configuration parameter for the target position to the collection device is performed by the platform server.

According to another aspect of the present application, a method for data analysis is provided. The method comprises: acquiring collection data of a collection device located at a target position; inputting the collection data into a configuration parameter categorization model so as to obtain a configuration parameter category of the collection device; inputting the collection data into a content analysis model corresponding to the configuration parameter category of the collection device so as to obtain a content analysis result of the collection data.

In some embodiments, the method further comprises: acquiring first historical collection data for the target position and a configuration parameter category of the collection device collecting the first historical collection data; and performing model training using the first historical collection data as a sample and the configuration parameter category of the collection device collecting the first historical collection data as a label so as to obtain the configuration parameter categorization model.

In some embodiments, the method further comprises: acquiring second historical collection data for the target position, a configuration parameter category of the collection device collecting the second historical collection data and a target content result of the second historical collection data, the target content result being objective content reflected by the second historical collection data; and performing model training for each configuration parameter category using the second historical collection data as a sample and the target content result of the second historical collection data as a label so as to obtain the content analysis model corresponding to each configuration parameter category.

In some embodiments, inputting the collection data into a configuration parameter categorization model so as to obtain a configuration parameter category of the collection device and inputting the collection data into a content analysis model corresponding to the configuration parameter category of the collection device so as to obtain a content analysis result of the collection data are performed by an algorithm model component, wherein the algorithm model component is arranged in an edge device or a platform server.

According to yet another aspect of the present application, an apparatus for device configuration parameter processing is provided. The apparatus comprises: a collection data acquisition module configured to acquire collection data of a collection device located at a target position, wherein the collection data is configured to be input into a content analysis model for the target position so as to obtain a content analysis result of the collection data; a configuration parameter change determination module configure to determine, based on the collection data, whether a current configuration parameter of the collection device has changed; a preset configuration parameter sending module configured to send, in response to the current configuration parameter of the collection device having changed, a preset configuration parameter for the target position to the collection device so as to adjust the current configuration parameter of the collection device based on the preset configuration parameter; wherein when the input into the content analysis model is collection data of the collection device configured with the preset configuration parameter, the content analysis result output by the content analysis model has a first content analysis accuracy rate, and when the input into the content analysis model is collection data of the collection device configured with the current configuration parameter, the content analysis result output by the content analysis model has a second content analysis accuracy rate, wherein the first content analysis accuracy rate is higher than the second content analysis accuracy rate.

According to still another aspect of the present application, an apparatus for data analysis is provided. The apparatus comprises: a collection data acquisition module configured to acquire collection data of a collection device located at a target position; a configuration parameter category determination module configured to input the collection data into a configuration parameter categorization model so as to obtain a configuration parameter category of the collection device; a content analysis module configured to input the collection data into a content analysis model corresponding to the configuration parameter category of the collection device so as to obtain a content analysis result of the collection data.

According to a further aspect of the present application, a computing device is provided, comprising: a memory configured to store computer-executable instructions; and a processor configured to implement the method according to any of the embodiments of the present application when the computer-executable instructions are executed by the processor.

According to still a further aspect of the present application, a computer-readable storage medium is provided, wherein the computer-readable storage medium has computer-executable instructions stored thereon and is configured to implement the method according to any of the embodiments of the present application when the computer-executable instructions are executed.

According to yet a further aspect of the present application, a computer program product comprising computer-executable instructions is provided, wherein the computer-executable instructions are configured to implement the method according to any of the embodiments of the present application when executed by a processor.

BRIEF DESCRIPTION OF DRAWINGS

By reading detailed description for the non-limiting embodiments made with reference to the following drawings, other features, goals and advantages of the present application will be more obvious.

DETAILED DESCRIPTION

Figure 1:
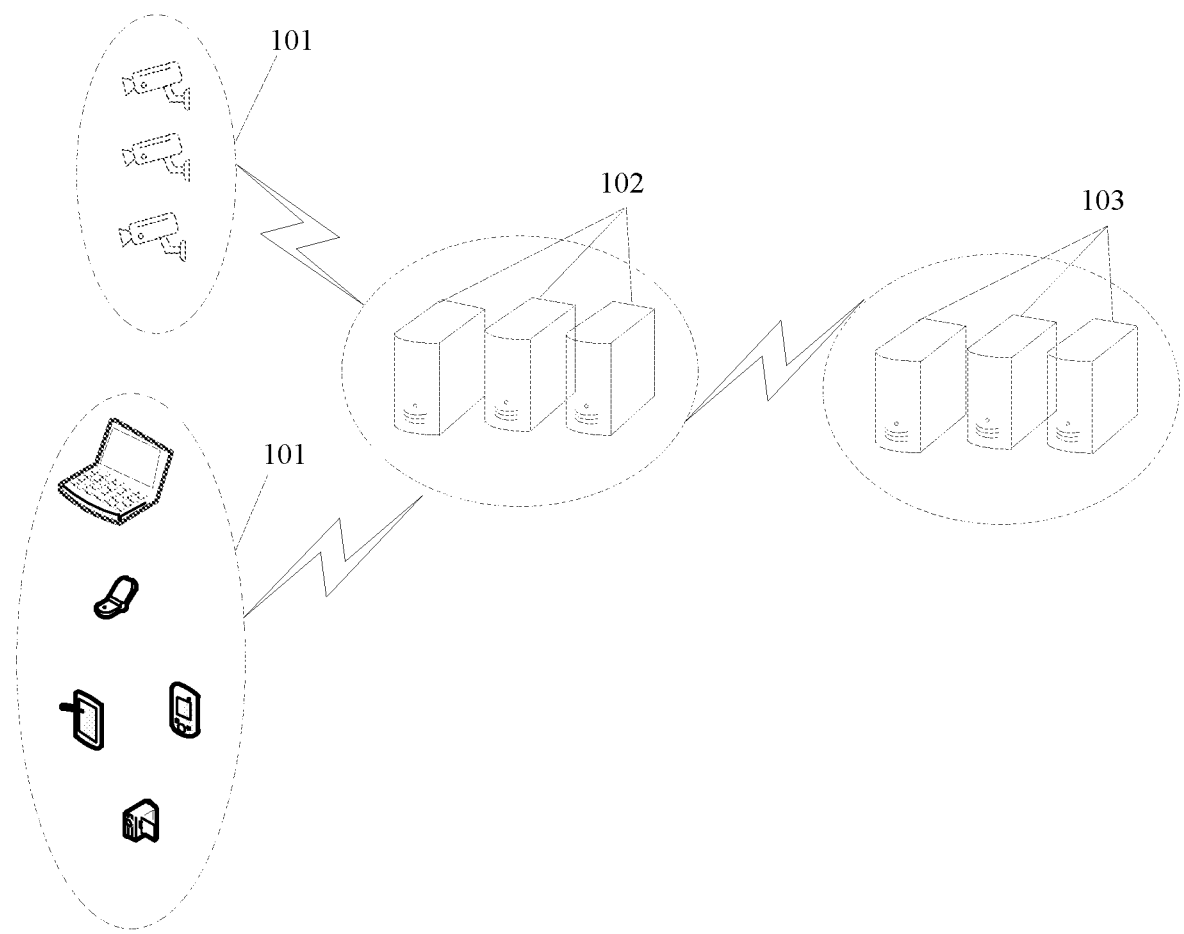
FIG. 1 shows an application scene diagram of the method for device configuration parameter processing provided in the embodiments of the present application.

The embodiments of the present application will be further explained in detail in combination with the drawings. It is understandable that the specific embodiments depicted herein are only used for explaining the present application, instead of limiting it. Besides, it should be also noted that in order to facilitate the depiction, only portions related to the present application may be shown in the drawings.

It should be noted that the embodiments in the present application and the features of the embodiments can be combined with each other where no conflict is caused.

Please refer to FIG. 1. FIG. 1 shows an exemplary application scene in which the method provided in the embodiments of the present application can be implemented. In the application scene shown in FIG. 1, at least one collection device 101, at least one edge device 102 and at least one platform server 103 are included.

The collection device 101 may be configured to collect data, and the data collected by the collection device may be called the collection data. The collection device 101 comprises but is not limited to a terminal device, a sensing device and so on. The sensing device may be a camera for example, which may be applied in the industrial field and specifically configured to test a certain process step, e.g., to capture images related to the process step. In some embodiments, the camera may photograph a product obtained after a certain process is accomplished, thereby obtaining images. The images themselves may objectively reflect the actual situations of the products, for example, whether there are any defects in the products, and these situations may also be referred to as an actual result reflected by the images. A computer-based method may be used to identify the images and analyze the image contents so as to obtain a content analysis result about whether there are any defects in the products. In a more specific embodiment, the sensing device may be an Automated Optical Inspection device (AOI device for short). The AOI device may detect common defects encountered during the production based on optical principles.

The sensing device may also be a temperature sensor, a humidity sensor, pressure sensing means, etc., for collecting the sensing data corresponding to a certain process step. The terminal device comprises but is not limited to a smart phone, a tablet, a television, a laptop, a desktop, a virtual reality device, etc., which will not be specifically limited herein.

The edge device is used for providing physical connection and achieving communication between networks, e.g., connecting an internal Local Area Network (LAN) to the Internet or an external Wide Area Network (WAN). A traditional edge device comprises an edge router, a routing switch, a firewall, a multiplexer, and other Wide Area Network (WAN) devices. A smart edge device is configured with a built-in processor and thus has on-board analysis or artificial intelligence capabilities. By processing a certain amount of data directly on the smart edge device instead of uploading, processing and storing data on the cloud, the efficiency can be improved and the costs can be reduced.

The edge device 102 comprises but is not limited to an edge gateway and an edge server. The edge gateway is a gateway deployed on an edge side of a network, which connects the physical and digital worlds through network connectivity, protocol conversion and other functions, and provides light-weight connection management, real-time data analysis and application management function. In some network frameworks, the edge device 102 comprises an edge server. The edge server provides a user with an access to the network and an ability of communicating with other server devices. For example, the edge server may be a set of servers performing a single function, e.g., firewall servers, cache servers, load balancing servers, DNS servers, and so on.

Figure 2:
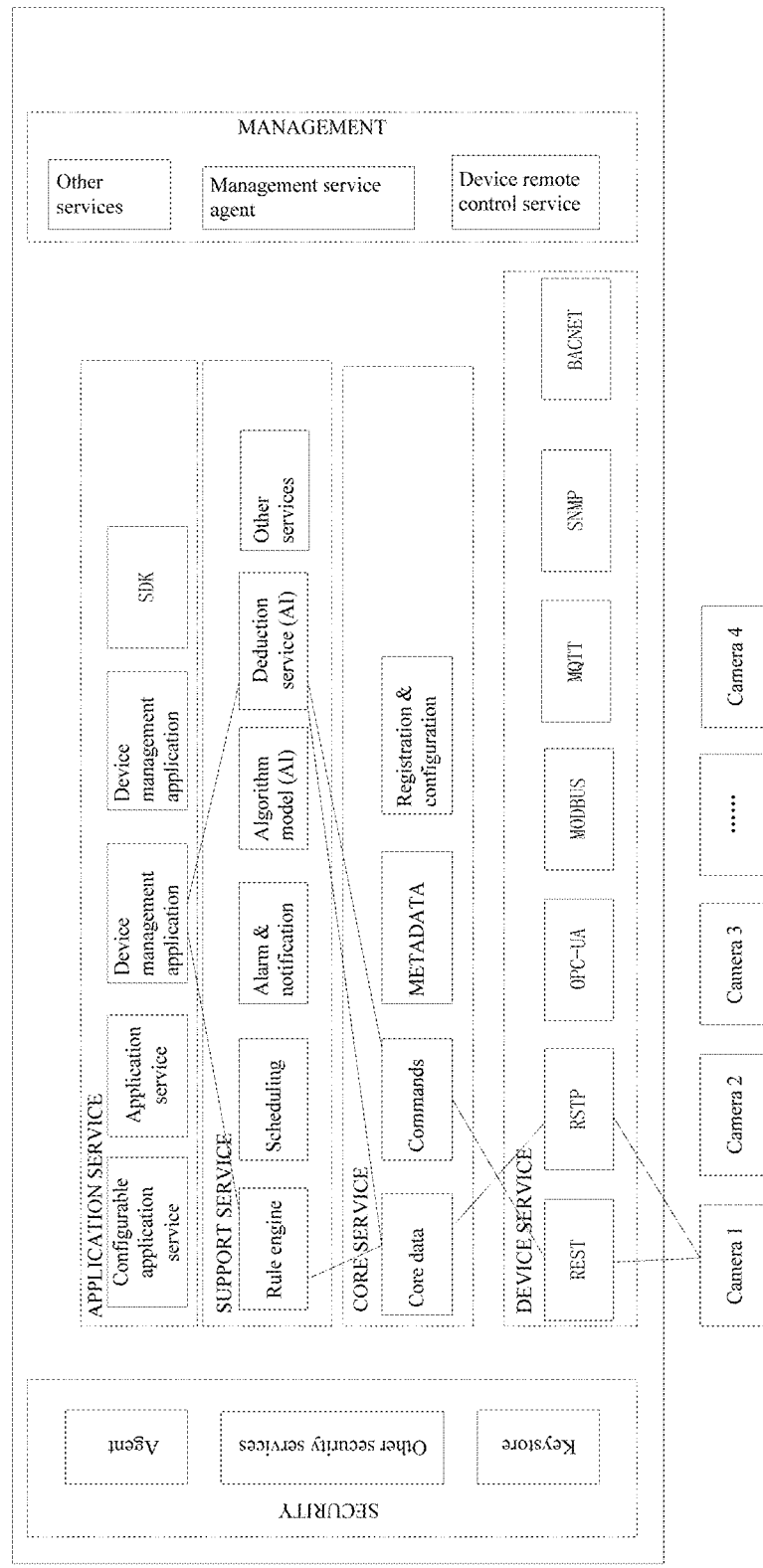
FIG. 2 shows a system framework diagram of an edge device provided in the embodiments of the present application.

In some embodiments, in an IoT network framework, some sensing devices and executing devices are connected with a platform server via an edge gateway, and some smart terminal devices are connected with a platform server via an edge server. FIG. 2 schematically shows a system framework of the edge device 102. As shown in FIG. 2, the edge device 102 may adopt an open source edge computing framework (edge X Foundry). The open source edge computing framework may adopt a hierarchical structure design which includes, from bottom to top, device service (which may include device service components), core service (which may include core service components), support service (which may include rule service components and algorithm model components), and application service. The open source edge computing framework may also comprise security service and management service (including service remote control service components). The device server layer may be a set of specific micro-services in direction communication with physical devices. Each device micro-service may manage a plurality of physical devices supporting respective interfaces. Above the device service layer is the core service layer, including core-data, core-command, core-metadata, registry & config and other services. Above the core service layer is the support service layer, including providing common services such as logs, rule engines, reminders, etc.

The platform server 103 may be used to store algorithm models, directly receive the collection data uploaded by the collection device and analyze the uploaded collection data. The platform server 103 may also provide algorithm models to the edge device so as to enable the edge device to analyze the collection data uploaded by the collection device.

The above servers may be independent physical servers, or a server cluster or a distributed system consisting of a plurality of physical servers, or even cloud servers that provide basic cloud computing services such as cloud service, cloud database, cloud computing, cloud functions, cloud storage, network service, cloud communication, middleware service, domain name service, security service, CDN, and big data and artificial intelligence platforms.

In the above application scenes, to take the industrial IoT as an example, the collection device may be a camera deployed at each target position in an industrial environment. When the camera is replaced, or upgraded, or reset, configuration parameters of the camera may have changed, which leads to changes in the image contents collected by the camera. For example, the focal length of the camera may have changed, causing changes in the contents collected by the camera. An increased focal length will result in a decrease in the number of targets being photographed, but each target will be clearer; and a decreased focal length will result in an increase in the number of targets being photographed, but each target will be more blurry. Besides, fine tuning of the focal length may also cause the captured image to become clearer or more blurry overall. At an industrial monitoring position, an increased focal length will result in a decreased range of detection areas covered by the image; on the contrary, a decreased focal length will result in an increased range of detection areas covered by the image. Therefore, the camera may have a unique focal length most suitable for each target position. For another example, the shooting color and resolution of the camera may change. Changes in the resolution may lead to changes in pixel regions of the image. Changes in the shooting color may lead to changes in RGB values of the image.

When the collection data that have changed are input into an algorithm model (e.g., a content analysis model) constructed for an original configuration parameter, the computation or detection results may be inaccurate, and the workload of manual verification may be increased.

In order to improve the accuracy rate of the computation results, the algorithm model may be retrained. However, to train the algorithm model, it will take tremendous time to re-acquire the training data and perform training and deployment of the algorithm model, which reduces the utilization efficiency of the algorithm model.

The present application proposes a method for device configuration parameter processing to at least solve the above problem. The method processes configuration parameters of a device without re-training the algorithm model, and can improve the utilization efficiency of the algorithm model while ensuring the content analysis accuracy of the collection data.

Figure 3:
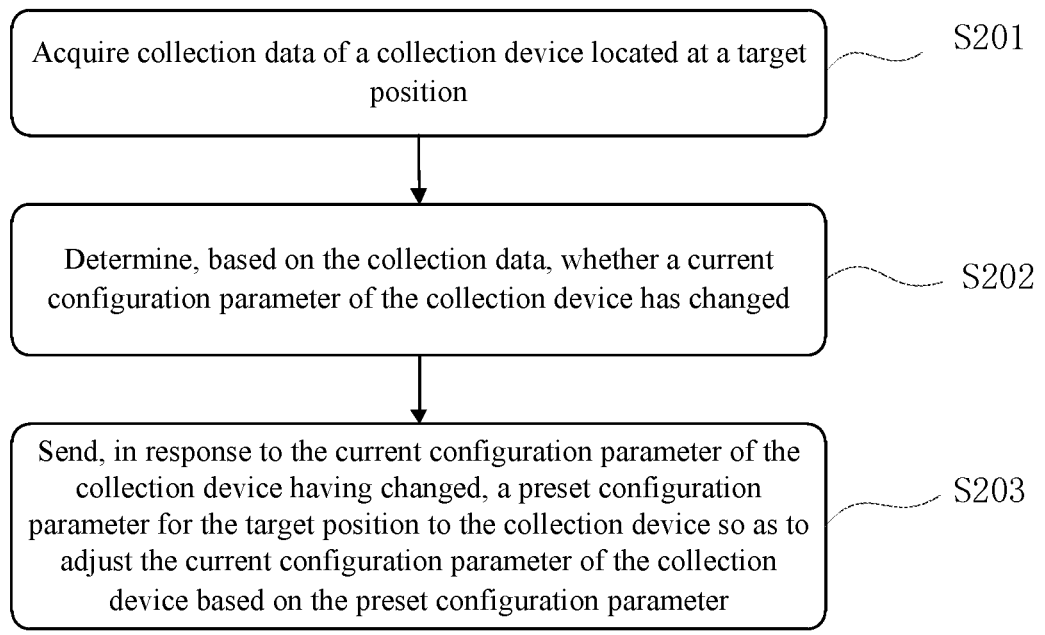
FIG. 3 shows an exemplary flow chart of the method for device configuration parameter processing provided in the embodiments of the present application.

The method for device configuration parameter processing provided in the embodiments of the present application will be described with reference to FIG. 3. Please refer to FIG. 3. FIG. 3 schematically shows a flow chart of the method for device configuration parameter processing provided in the embodiments of the present application. The method may be implemented by an apparatus for device configuration parameter processing. In some embodiments, the apparatus for device configuration parameter processing may be arranged in an edge device and/or a platform server.

As shown in FIG. 3, the method comprises:

At step S201, acquiring collection data of a collection device located at a target position.

In the above step S201, the collection data is configured to be input into an algorithm model for the target position, e.g., a content analysis model, so as to obtain a computing result, e.g., a content analysis result of the collection data.

At step S202, determining, based on the collection data, whether a configuration parameter of the collection device has changed.

At step S203, sending, in response to the configuration parameter of the collection device having changed, a preset configuration parameter for the target position to the collection device so as to adjust the configuration parameter of the collection device based on the preset configuration parameter.

In the above step S203, there is a correspondence between the preset configuration parameter and the content analysis model. The correspondence may be embodied by the fact that the content analysis result obtained by inputting into the content analysis model the collection data collected by the collection device configured with the preset configuration parameter has the highest content analysis accuracy rate. For example, if the content analysis result output by the content analysis model has a first content analysis accuracy rate for collection data collected by the collection device configured with the preset configuration parameter, and the content analysis result output by the content analysis model has a second content analysis accuracy rate for collection data collected by the collection device configured with the current configuration parameter, the first content analysis accuracy rate is higher than the second content analysis accuracy rate.

In the above steps, the target position refers to a process position of the collection device. In some embodiments, the target position may be determined by a positioning device installed within the collection device. The processing position refers to a position corresponding to a process step according to needs of industrial manufacture. For example, there are multiple process steps in a certain production line, and each process step may correspond to a process position. The process position may be a site, or a shop location within a factory corresponding to the same process step.

In the above steps, the content analysis model refers to a model constructed by deep learning algorithms or neural network algorithms and configured to achieve detection and identification of industrial data. The content analysis model comprises but is not limited to a defect detection model, a defect rate analysis model, an installation position testing model, etc.

After training the content analysis model, the method proposed in the embodiments of the present application can acquire collection data reported by the collection device at the target position, and then determine, based on the collection data, whether the configuration parameter of the collection device has changed.

In some embodiments, after receiving the collection data reported by the collection device, it is possible to determine whether the configuration parameter of the collection device has changed based on a data index of the collection data or a current device identifier of the collection device collecting the collection data.

Specifically, it is possible to determine whether the configuration parameter of the collection device has changed based on a same data index of the collection data and temporally preceding data for the same target position.

The data index may be an index capable of evaluating whether the configuration parameter of the collection device has changed. For example, when the collection data is image data, the data index of the collection data may be the size, position, shape, and color of an object within the image data, as well as any one or more of the resolution, brightness, contrast, definition, and a color parameter (such as white balance) of the image. In the application field of product process testing, the collection device is generally fixed, and the surrounding environment (for example, lighting conditions) of its target position is also fixed. Therefore, when the configuration parameter of the collection device has not changed, the data indexes exemplified above will generally remain the same. In other words, if there is a change in the above data indexes, it means that the configuration parameter of the collection device has changed.

For example, the lighting conditions for the same station are generally constant. Therefore, from the perspective of image processing, the color parameter of image data captured by an image collection device at different times for the same station should also be the same. After collecting the image data, it is possible to obtain the color parameter of the image by means of some image processing tools. For example, the color parameter of the image data may be a first value. In this case, if the color parameter of the image data collected for the same station at an earlier time is found to be a second value different from the first value while there is no change in the lighting conditions of the station, it may indicate that the image collection device has been reset due to a failure or other reasons such that the configuration parameter has been reset.

For another example, the position of the image collection device is fixed for the same station, and its position relative to the production line is also fixed. Therefore, from the perspective of physical hardware, the positions of physical optical elements in the image collection device relative to the station are also fixed. In this case, in each frame of the image captured, the size of the product on the production line should also remain unchanged in the image. After replacement of the image collection device, there may be a change in the configuration parameter of the optical elements inside, e.g., a change in the focal length of the image collection device as a result. This may lead to a change in the size of the product on the production line in the image. Therefore, it is possible to determine whether the configuration parameter of the image collection device has changed by comparing whether the size of a target object within the collected image data has changed with respect to the size of the target object within the image data collected for the same station at an earlier time.

In some other embodiments, the replacement of the collection device may also be determined by comparing a device identifier of the collection device. For example, the collection data may be set to comprise a device identifier of the collection device. In this way, it is possible to determine whether the collection device has been replaced by comparing a current device identifier of a current collection device with a historical device identifier of a historical collection device for this station that has been stored. When the current device identifier is not consistent with the historical device identifier, it is determined that the configuration parameter of the device has changed.

To take an AOI device as an example, the data index of the collection device may be a tunable parameter of the AOI device. The tunable parameter of the AOI device comprises focal length, brightness, color difference, white balance, image compression rate (or resolution), etc.

In some embodiments, determining, based on the collection data, whether a configuration parameter of the collection device has changed may comprise: comparing a same data index of the collection data and historical collection data to obtain a first comparison result; and determining, based on the first comparison result, whether a configuration parameter of the collection device has changed. The historical collection data is data acquired for the target position at a historical time. The historical time is temporally earlier than the data collection time. In these embodiments, the historical collection data is namely a same data index of temporally preceding data for the same target position. The same data index refers to a same type of data indexes in the collection data and the historical collection data. For example, an example of the same data index is a white balance index of the collection data and a white balance index of the historical collection data.

In some further embodiments, determining, based on the collection data, whether a configuration parameter of the collection device has changed comprises: comparing a same data index of the collection data and training data of the content analysis model to obtain a second comparison result; and determining, based on the second comparison result, whether a configuration parameter of the collection device has changed. In these embodiments, training data of a content analysis model for the station is chosen as temporally preceding data for the same target position.

During the determination whether the configuration parameter has changed, a data index of the collection data may be readily obtained through simple processing of the collection data. For example, the data index may be definition of the collection data. The definition is related to the position of an optical lens within a camera of an image collection device. Through movement of the position of the optical lens, the definition can be adjusted. When the optical lens moves in a direction perpendicular to an imaging plane, a distance between the camera lens and the imaging plane will change correspondingly, thereby leading to a change in the definition of the images collected. Through adjustment of the position of the optical lens, the images collected can be rendered clearer. For another example, the data index may be a color parameter. In further embodiments, the configuration parameter may be a combination of a plurality of parameters such as a combination of a resolution parameter, a color parameter, an optical zoom parameter, etc.

In order to identify changes in the configuration parameter, it is possible to compare a same data index of collection data acquired at a current collection time and collection data acquired at a certain time prior to the current collection time. Alternatively, it is possible to compare a same data index of collection data acquired at a current collection time and training data for training the content analysis model.

In the embodiments of the present application, adjustment of the configuration parameter of the collection device is triggered through determination of changes in the configuration parameter. As compared with the related art in which changes in the configuration parameter are identified artificially, the present application can save the time for device parameter adjustment effectively, improve the efficiency of device adjustment, and thus promote the utilization efficiency of the content analysis model.

After determining that the configuration parameter of the collection device has changed, it is possible to acquire a preset configuration parameter corresponding to the target position and then send the preset configuration parameter to the collection device so as to adjust the configuration parameter of the collection device based on the preset configuration parameter. The term "preset configuration parameter" may be understood in this way: a content analysis accuracy rate of a content analysis result obtained from collection data collected by a collection device configured with the preset configuration parameter is higher than that of a content analysis result obtained from collection data collected by a collection device configured with the current configuration parameter. When analyzing the collection data collected by the collection device configured with different configuration parameters, the content analysis model may obtain different content analysis results. The content analysis accuracy rate obtained by inputting the collection data obtained from the collection device configured with a certain configuration parameter into the content analysis model may be higher than the content analysis accuracy rate obtained by inputting the collection data obtained from the collection device configured with other configuration parameters into the content analysis model. Such configuration parameter may be taken as a preset configuration parameter for such content analysis model. The content analysis accuracy rate is determined based on a difference between the actual situation reflected by the collection data and the analysis result output by the content analysis model into which the collection data is input. The smaller the difference is, the higher the content analysis accuracy rate is.

During the training phase of a content analysis model, it is possible to input historical image data as a sample and a target content result of the historical image data as a label into a content analysis model to be constructed for training. The term "target content result" refers to objective content reflected by the collection data. For example, in a scene where the content analysis model is used to analyze whether there is a defect in a product, the target content result is an objective conclusion on whether there is a defect in the product within image data. After the training is accomplished, the image data is input into the trained content analysis model which will output a content analysis result. The term "content analysis result" refers to a conclusion drawn by the content analysis model to determine whether there is a defect in the product within the image data.

The content analysis accuracy rate is an index for evaluating the content analysis result output by the content analysis model. For example, when the content analysis model is a defect detection model, the corresponding evaluation index is an accuracy rate of the defect detection result. The accuracy rate of the defect detection result can reflect a matching degree between the configuration parameter of the collection device and the content analysis model. The accuracy rate of the output result of the content analysis model can be ensured effectively by configuring the collection device with a configuration parameter corresponding to a high content analysis accuracy rate.

Based on the above embodiments, it is possible to first construct a configuration parameter categorization model, and input the collection data into the configuration parameter categorization model to obtain a current configuration parameter category of the collection device corresponding to the collection data; and then compare the current configuration parameter category with a preset configuration parameter category. If the current configuration parameter category of the collection device is not the preset configuration parameter category, the current configuration parameter of the collection device is determined to have changed, and a preset configuration parameter corresponding to the preset configuration parameter category is sent to the collection device.

Alternatively, it is possible to acquire current position information of the collection device and then acquire, based on the current position information, a preset configuration parameter corresponding to the current position information.

After the preset configuration parameter pre-stored during the training phase is acquired, it is sent to the collection device to control the collection device for adjustment of the configuration parameter such that the collection device collects data according to the adjusted configuration parameter. After that, an accurate computation result can be obtained when the collected data is input into the content analysis model for computation.

By adjusting the configuration parameter of the collection device, the embodiments of the present application can effectively avoid re-training the content analysis model and thus improve the computation efficiency.

Based on the above embodiments, sending a preset configuration parameter to the collection device may further comprise: converting the preset configuration parameter into a control instruction corresponding to the collection device, and sending the control instruction to the collection device such that the collection device performs parameter adjustment corresponding to the preset configuration parameter in response to the control instruction.

By converting the preset configuration parameter into a control instruction corresponding to the collection device, the time for parameter adjustment performed by the collection device can be effectively saved, and the efficiency of device control can be improved.

Figure 4:
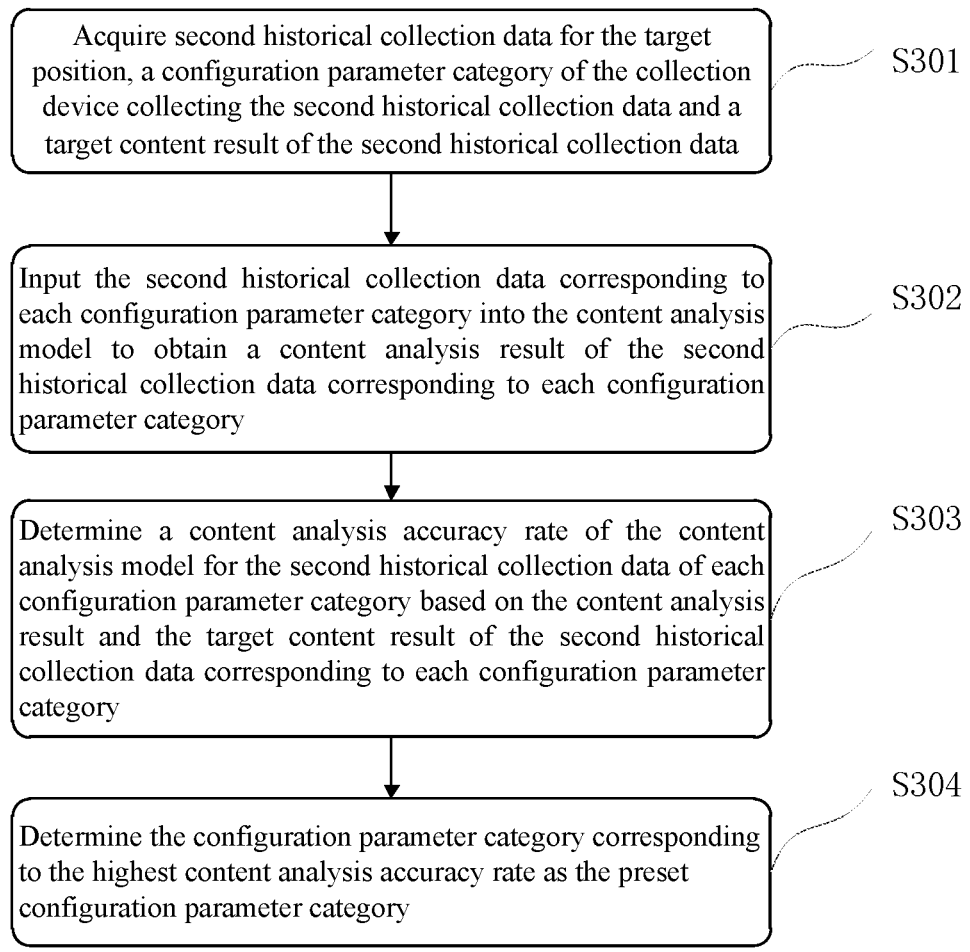
FIG. 4 shows an exemplary flow chart of the method for determining a preset configuration parameter provided in the embodiments of the present application.

The acquisition of the preset configuration parameter and the preset configuration parameter category will be described below. In some embodiment, the preset configuration parameter is pre-determined prior to the application phase. FIG. 4 shows an exemplary flow chart of the method for determining a preset configuration parameter provided in the embodiments of the present application. As shown in FIG. 4, the method may be implemented by an apparatus for device configuration parameter processing. The apparatus for device configuration parameter processing may be arranged in an edge device or a platform server. As shown in FIG. 4, the method comprises steps as follows.

Step S301, acquiring historical collection data for the target position, a configuration parameter category of the collection device collecting the historical collection data and a target content result of the historical collection data, the target content result being objective content reflected by the respective collection data.

Step S302, inputting the second historical collection data corresponding to each configuration parameter category into the content analysis model to obtain a content analysis result of the second historical collection data corresponding to each configuration parameter category.

Step S303, determining a content analysis accuracy rate of the content analysis model for the historical collection data of each configuration parameter category based on the content analysis result and the target content result of the second historical collection data corresponding to each configuration parameter category.

Step S304, determining the configuration parameter category corresponding to the highest content analysis accuracy rate as the preset configuration parameter category.

In the above steps, the historical collection data refers to multiple collection data collected under different configuration parameter conditions for the same collection device at the same station during the model training phase. For example, a camera deployed at the same station collects multiple image data under different configuration parameter conditions. Table (1) shows examples of the different configuration parameter conditions.

zoom parameter (i.e., an optical zoom parameter) of 1-10x, an aperture parameter of F0.95, a 3D attribute On/Off parameter of On, and a color attribute of black-and-white.

Different content analysis accuracy rates may be obtained by inputting historical collection data collected by a collection device configured according to the configuration parameter corresponding to the category 1 and historical collection data collected by a collection device configured according to the configuration parameter corresponding to category 2 into the content analysis model respectively.

When the content analysis model is a defect detection model, the defect detection model is obtained from the training using historical collection data collected for a certain station as a sample and a real result about whether there is a defect reflected by the historical collection data as a label.

It should be noted that the yield rate of the production line is generally constant in the application of defect detection. Therefore, even if different collection data are input into the content analysis model, the product yield rate reflected by the resultant content analysis result on the whole should approximate the real yield rate. However, as mentioned above, different content analysis accuracy rates are obtained by inputting the historical collection data corresponding to category 1 and the historical collection data corresponding to category 2 into the content analysis model respectively. This shows that the content analysis accuracy rate of the content analysis model is related to the configuration parameter of the collection device. Therefore, it is possible to calculate the content analysis accuracy rate for each configuration parameter category respectively and then determine the configuration parameter corresponding to the configuration parameter category having the highest content analysis accuracy rate as a preset configuration parameter.

In some embodiments, a configuration parameter categorization model may be constructed first. For example, historical collection data for the target position and a configuration parameter category of the collection device collecting the first historical collection data may be acquired. Then model training is performed using the historical collection data as a sample and the configuration parameter category of the collection device collecting the historical collection data as a label so as to obtain the configuration parameter categorization model. During the application phase, the collection data is input into the configuration parameter categorization model to obtain a current configuration parameter category of the collection device. Then, it is determined whether the current configuration parameter

TABLE 1

| Configuration parameter category | Resolution (720P/1080P 4K/8K) | Zoom (1-20x) | Aperture (F0.95/F2.4/ F4/F7.1/F16) | 3D (On/Off) | Color (Black-and-white/Color) |
| --- | --- | --- | --- | --- | --- |
| Category 1 | 720P | 1-10x | F0.95 | On | Black-and-white |
| Category 2 | 1080P | 1-10x | F2.4 | On | Color |
| Category 3 | 720P | 10-20x | F0.95 | On | Black-and-white |
| Category 4 | 4K/8K | 10-20x | F4 | Off | Color |

The result of the configuration parameter categorization may be indicated by a configuration parameter category which may be numerical values, letters, or other symbols that can be used to identify the categorization of configuration parameters.

For example, in the above table, category 1 represents a configuration parameter of a first category, the configuration parameter comprising: a resolution parameter of 720 P, a category of the collection device is the preset configuration parameter category. If the current configuration parameter category of the collection device is not the preset configuration parameter category, the current configuration parameter of the collection device is determined to have changed.

Optionally, the embodiments of the present application may also invoke a parameter optimization model constructed in advance to optimize the preset configuration parameter, thereby obtaining an optimal preset configuration parameter. For example, when two or more sets of preset configuration parameters are obtained, it is possible to perform optimization on the multiple sets of preset configuration parameters using a gradient descent optimization algorithm so as to obtain an optimal adjustment range between the multiple sets of preset configuration parameters. Then, an optimal preset configuration parameter can be determined according to the optimal adjustment range. The embodiments of the present application can match the algorithm models through adjustment of the preset configuration parameter, which can effectively improve the utilization efficiency of the algorithm model.

When there is only one set of preset configuration parameter corresponding to the content analysis model, it is also possible to perform optimization on the preset configuration parameter according to the preset adjustment range.

In some embodiments, the configuration parameters of the historical collection data may be categorized with reference to the categorization result in the above table. Then the historical collection data is input into the configuration parameter categorization model for categorization so as to obtain a configuration parameter category corresponding to each historical collection data and divide the historical collection data into multiple subsets according to the configuration parameter category. Next, defect detection is carried out for each subset using a defect detection model constructed in advance. Then a detection result, e.g., a defect rate, corresponding to each subset of the historical collection data can be obtained. After that, the defect rate of each subset is compared with a real defect rate reflected by the historical collection data to obtain a content analysis accuracy rate of each subset, e.g., a defect detection accuracy rate.

Then the configuration parameter category corresponding to the subset having the highest content analysis accuracy rate is determined as a preset configuration parameter category based on the content analysis accuracy rate of each subset. The configuration parameter corresponding to the preset configuration parameter category is namely a preset configuration parameter. Through the above procedure, a correspondence between the content analysis model and the preset configuration parameter can be constructed.

Based on the above embodiments, it is possible to invoke a parameter category aggregation model constructed in advance to aggregate a plurality of parameter categorization results so as to obtain an aggregated configuration parameter category, and then take the aggregated configuration parameter category as the categorization result.

In the above steps, the configuration parameter categorization model is mainly used for screening out major configuration parameters affecting identification of the target. The complexity of a parameter categorization model is much lower than that of an algorithm model for industrial detection. When the configuration parameter of the collection device has changed, it is unnecessary to retrain the parameter categorization model.

The above parameter categorization model or parameter category aggregation model may be constructed through supervised learning or unsupervised learning.

The parameter category aggregation model may perform aggregation based on a similarity between different categorization results in the result output by the parameter categorization model.

For example, multiple historical configuration parameter categories are input into a parameter category aggregation model constructed in advance to obtain a similarity between the multiple historical configuration parameter categories. The similarity may be a similarity between any two of the configuration parameter categories. For instance, one of the categorization results of the historical configuration parameters may be {A,B,C,D}. When the value of the similarity between categorization results A and B is greater than or equal to a preset threshold, it means that a difference between the image identification result of the configuration parameter corresponding to categorization result A and the image identification result of the configuration parameter corresponding to categorization result B is rather small. Categorization result A and categorization result B may be aggregated. Alternatively, either categorization result A or categorization result B may be deleted. The preset threshold mentioned above may be a pre-set empirical value. Based on the above table (1), it is possible to obtain an aggregated configuration parameter category by invoking a configuration parameter category aggregation model constructed in advance to aggregate a plurality of historical configuration parameter categories. Table (2) shows an example of the aggregation of configuration parameter categories.

TABLE 2

| Parameter aggregation categorization result | Parameter categorization result | Resolution (720P/1080P 4K/8K) | Zoom (1-20x) | Aperture (F0.95/F2.4/ F4/F7.1/F16) | 3D (On/Off) | Color (Black-and-white/Color) |
| --- | --- | --- | --- | --- | --- | --- |
| Category 1 | Category 1 | 720P | 1-10x | F0.95 | On | Black-and-white |
|  | Category 3 | 720P | 10-20x | F0.95 | On | Black-and-white |

In table (2), the parameter aggregation categorization result is a result of the aggregation of category 1 and category 3 in the parameter categorization result. In the parameter categorization result of table (1), category 1 and category 3 have a higher similarity, and wherein the zoom parameter has quite small influence on the algorithm model detection result, so category 1 and category 3 may be aggregated to improve the categorization processing speed, thereby promoting the processing efficiency of the algorithm model.

Figure 5:
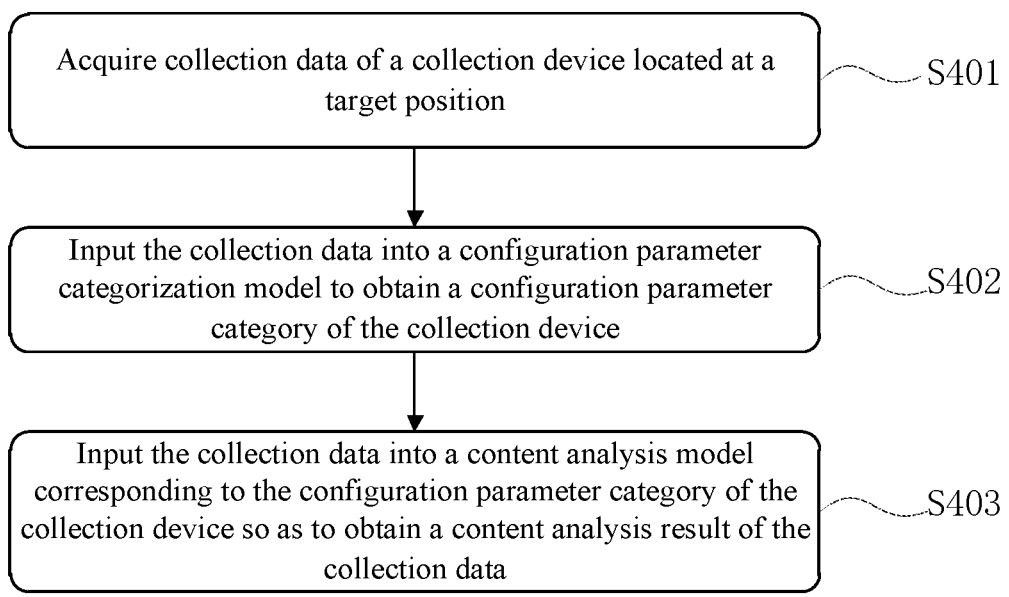
FIG. 5 shows an exemplary flow chart of the method for data analysis provided in the embodiments of the present application.

According to another aspect of the present application, a method for data analysis is also provided. This method can also avoid retraining the algorithm model when there is a change in the configuration parameter of the collection device. FIG. 5 shows an exemplary flow chart of the method for data analysis provided in the embodiments of the present application. This method may be implemented by an apparatus for data analysis. The apparatus for data analysis may be arranged in an edge device or a platform server. As shown in FIG. 5, the method comprises steps as follows.

Step S401, acquiring collection data of a collection device located at a target position;

Step S402, inputting the collection data into a configuration parameter categorization model to obtain a configuration parameter category of the collection device;

Step S403, inputting the collection data into a content analysis model corresponding to the configuration parameter category of the collection device so as to obtain a content analysis result of the collection data.

In the above steps, the problem of an overly long training duration of the algorithm model due to changes in the device configuration parameters may be solved by constructing a plurality of content analysis models in advance.

In some embodiments, the process of constructing a plurality of content analysis models may comprise:

Acquiring historical collection data for the target position, a configuration parameter category of the collection device collecting the historical collection data and a target content result of the historical collection data, the target content result being objective content reflected by the respective collection data;

Performing model training for each configuration parameter category using the second historical collection data as a sample and the target content result of the second historical collection data as a label to obtain the content analysis model corresponding to each configuration parameter category.

In some embodiments, the content analysis model and the configuration parameter categorization model may be stored in a platform server or an edge device. When the edge device receives reported current collection data, it identifies whether the configuration parameter of the current collection device has changed. When the configuration parameter of the current collection device is determined to have changed, a parameter categorization result of the current collection data is acquired. Then a content analysis model corresponding to the configuration parameter category is looked up and invoked to perform computation on the current collection data and obtain a content analysis result.

By constructing a plurality of content analysis model in advance for different configuration parameter categories and then choosing respective content analysis models for processing based on the configuration parameter category corresponding to the collection data, the embodiments of the present application can solve the problem of a reduced accuracy rate of the computation results of the content analysis model.

Based on the above embodiments, a configuration parameter categorization model may also be constructed in advance. For example, in some embodiments, historical collection data for the target position and a configuration parameter category of the collection device collecting the historical collection data are acquired, and then model training is performed using the historical collection data as a sample and the configuration parameter category of the collection device collecting the historical collection data as a label so as to obtain the configuration parameter categorization model.

In some embodiments, a configuration parameter aggregation model constructed in advance may also be invoked to aggregate a plurality of configuration parameter categories to obtain a plurality of aggregated configuration parameter categories. Then the aggregated configuration parameter category is used as the configuration parameter category.

After obtaining the configuration parameter category of the collection data, it is possible to look up a content analysis model corresponding to the configuration parameter category according to the configuration parameter category so as to perform content analysis process on the collection data.

Figure 6:
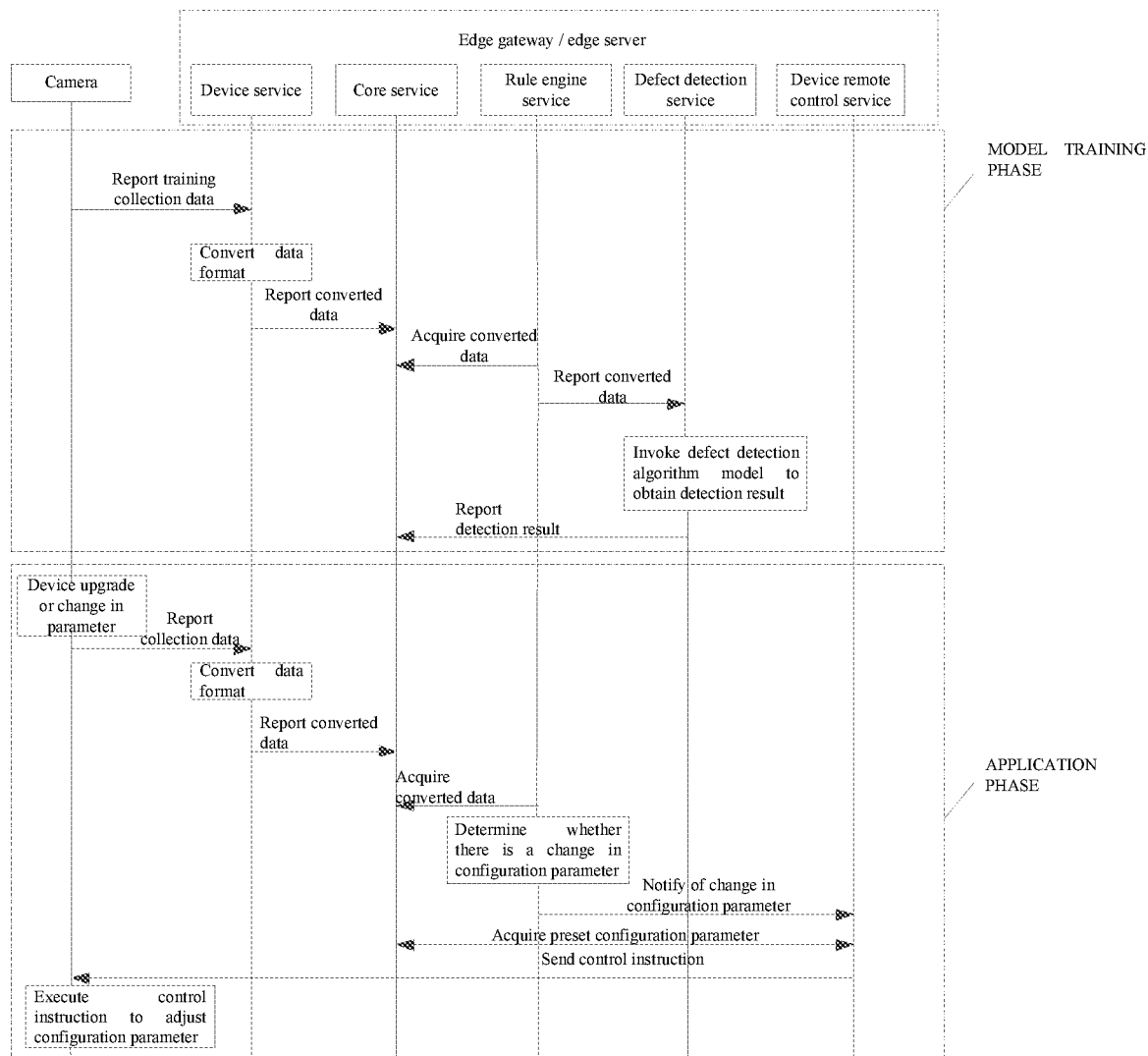
FIG. 6 shows an interactive process diagram of the method for device configuration parameter processing provided in the embodiments of the present application.
Figure 7:
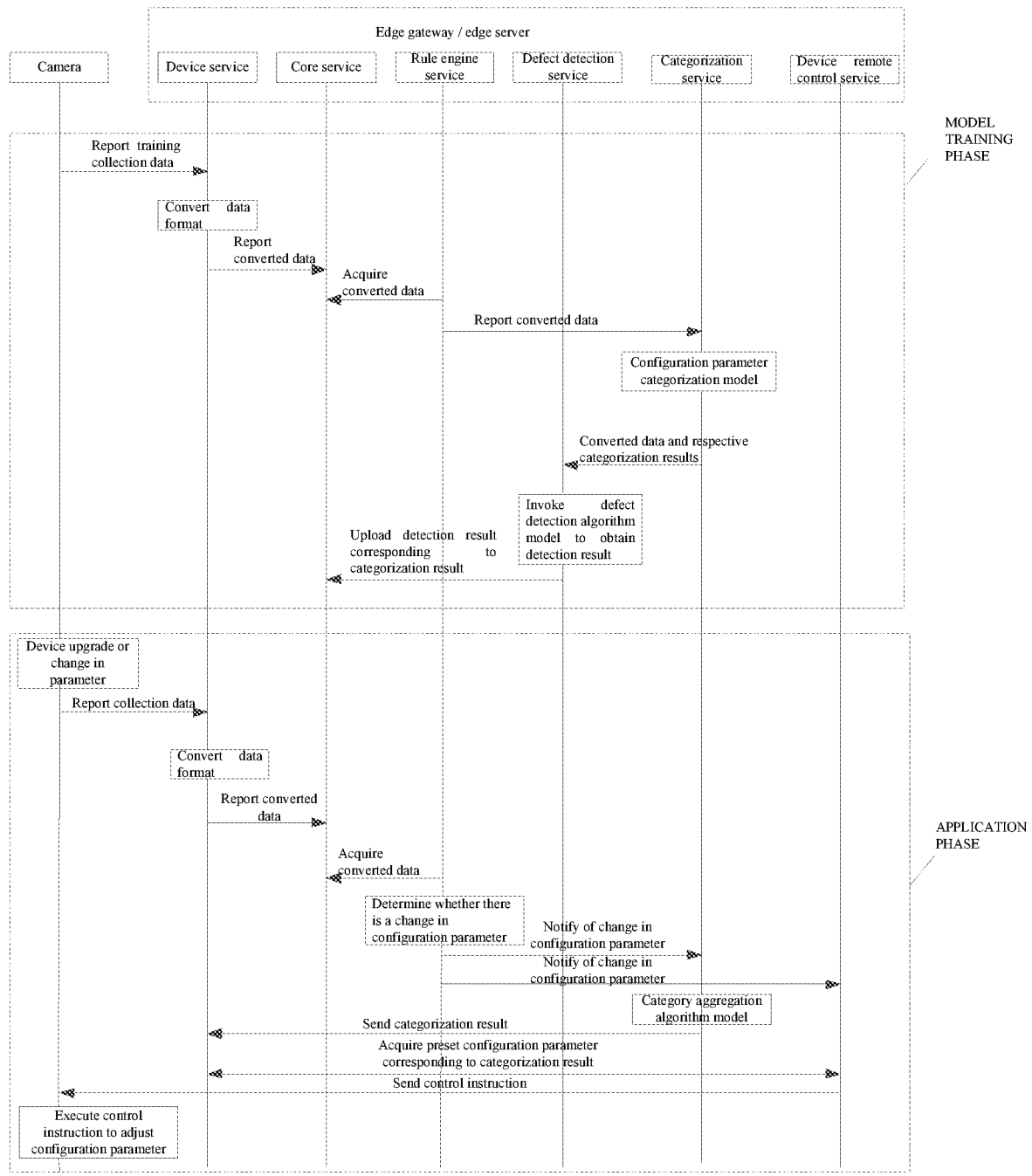
FIG. 7 shows another interactive process diagram of the method for device configuration parameter processing provided in the embodiments of the present application.

To render the inventive concept of the present application clearer, the present application will be described below from different angles with reference to FIGS. 6-10. In these embodiments, exemplarily, the collection device is a camera and the content analysis model is a defect detection model. FIGS. 6-7 describe an edge gateway or edge server in which the embodiments of the present application may be implemented. The edge gateway or edge server may adopt the open source framework shown in FIG. 2. A content analysis model component is constructed at a support service layer of the edge device, the content analysis model component comprising but not limited to a defect defection model.

As shown in FIG. 6, during the model training phase, image data under different configuration parameter conditions is collected via a camera. The image data is historical collection data. The image data is uploaded to a device service component of the edge device.

Prior to uploading the historical collection data, each historical collection data may be labeled with a respective category of the configuration parameter. For example, according to the categories described in table (1) mentioned above, each historical collection data is labeled with configuration parameter categories such as category 1, category 2, category 3 and category 4. Then a configuration parameter categorization model may be constructed based on the historical collection data and the respective configuration parameter category.

In order to solve the problem of the format of the collection data and the format of data processed by the edge device being different, it is possible to perform data format processing on the received collection data via the device service component. For example, when the data format of the collection data reported by the collection device is identified to be different from a target processing format, the data format of the collection data is converted in accordance with the target processing format to obtain the converted data. The above target processing format refers to a data format requirement of a server or gateway device that receives the reported collection data for processing.

For example, if the collection data is reported in an XML format and the target processing format is a JSON format, the XML format may be converted into the JSON format.

Then the converted data is reported to a core service component. The core service component is used for storing the collection data that has been converted. The way of storage comprises but is not limited to a file transfer server, a distributed file system, etc.

A rule engine service component acquires converted image data and then provides the converted data to a defect defection service component.

The defect detection service component invokes a defect detection algorithm model constructed in advance to perform defect detection on the converted image data to obtain a defect detection result and a conclusion on whether the defection result is accurate. Multiple different configuration parameter categorization results correspond to different accuracy rates of the detection result.

Then the defect detection service component reports the detection result and the accuracy rate of the detection result to the core service component for storage. The core service component establishes a correspondence between the defect detection model and the device configuration parameter corresponding to the detection result with the highest accuracy rate, and sets the device configuration parameter corresponding to the detection result with the highest accuracy rate as a preset configuration parameter.

Optionally, the defect detection service component may also report the detection result and the accuracy rate of the detection result directly to a device remote control service component.

During the application phase, the collection device reports the collection data to a device service component. The device service component may perform data format conversion on the collection data, which is the same as the processing during the model training phase.

The converted collection data is reported to the core service component.

The rule engine service component acquires the converted collection data and determines, based on the collection data, whether the configuration parameter of the collection device has changed. The specific way of determination may be to compare a data index of the collection data influencing the defect detection result.

When determining that the device configuration parameter has changed, the rule engine service component notifies the device remote control service component.

In response to the notification, the device remote control service component acquires the preset configuration parameter from the core service component, and collection data collected by the collection device configured with the preset configuration parameter can obtain a higher defect detection accuracy rate in the defect detection algorithm model.

After acquiring the preset configuration parameter, the device remote control service component converts the preset configuration parameter into a control instruction and sends the control instruction directly to the collection device so as to adjust the configuration parameter of the collection device.

As shown in FIG. 7, a categorization service component is also configured in the edge gateway or edge server in advance, and the categorization service component is used for invoking the configuration parameter categorization model or the configuration parameter category aggregation model. The configuration parameter categorization model and the configuration parameter category aggregation model perform categorization or category aggregation on the collection data identified by the rule engine service component.

During the model training phase, the processing procedure prior to the rule engine service component is the same as in FIG. 6, and the rule engine service component acquires converted image data and then provides the converted data to a categorization service component.

The categorization service component may perform category aggregation on the image data that has been artificially categorized in advance, thereby improving the processing speed of the categorization without affecting the working efficiency of the defect detection service component. The configuration parameter categorization model may be trained and constructed in the following ways. Historical collection data for the target position and a configuration parameter category of the collection device collecting the historical collection data are acquired; and model training is performed using the historical collection data as a sample and the configuration parameter category of the collection device collecting the historical collection data as a label so as to obtain the configuration parameter categorization model.

After the processing of the categorization service component, the defect detection service component invokes a defect detection algorithm model constructed in advance to perform defect detection on the converted image data to obtain a defect detection result and an accuracy rate of the defection result. Multiple different configuration parameter categorization results correspond to different accuracy rates of the detection result.

Then the defect detection service component reports the detection result and the accuracy rate of the detection result to the core service component for storage. The core service component establishes a correspondence between the defect detection model and the device configuration parameter corresponding to the detection result with the highest accuracy rate, and sets the device configuration parameter corresponding to the detection result with the highest accuracy rate as a preset configuration parameter.

Optionally, the defect detection service component may also report the detection result and the accuracy rate of the detection result directly to a device remote control service component.

The procedure of the application phase will be introduced below. Firstly, the collection device reports the collection data to a device service component. The device service component may perform data format conversion on the collection data, which is the same as the processing during the model training phase. The converted collection data is reported to the core service component.

The rule engine service component acquires the converted collection data and determines, based on the collection data, whether the configuration parameter of the collection device has changed. The specific way of comparison may be to compare a data index of the collection data influencing the defect detection result.

When determining that the device configuration parameter has changed, the rule engine service component notifies the device remote control service component.

In response to the notification of the change, the device remote control service component acquires a preset configuration parameter from the core service component, and there is a correspondence between the preset configuration parameter and the defect detection algorithm model.

After acquiring the preset configuration parameter, the device remote control service component converts the preset configuration parameter into a control instruction and sends the control instruction directly to the collection device.

Figure 8:
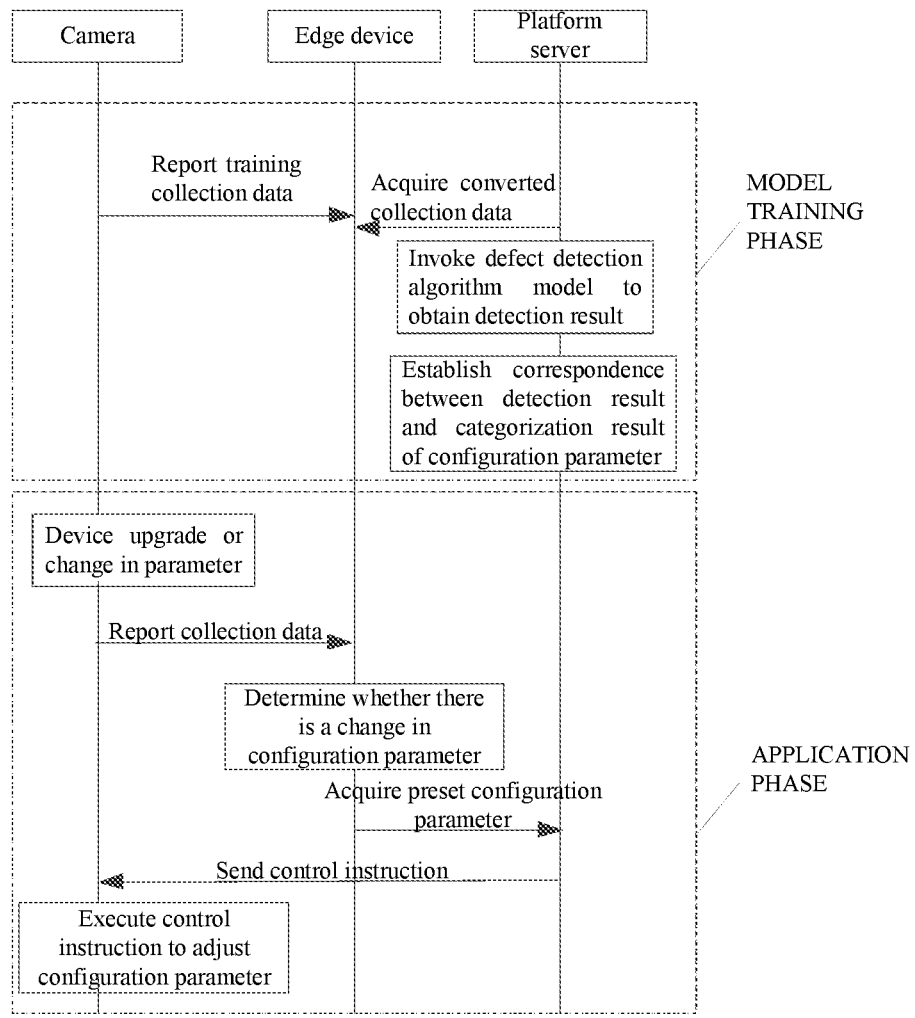
FIG. 8 shows still another interactive process diagram of the method for device configuration parameter processing provided in the embodiments of the present application.
Figure 9:
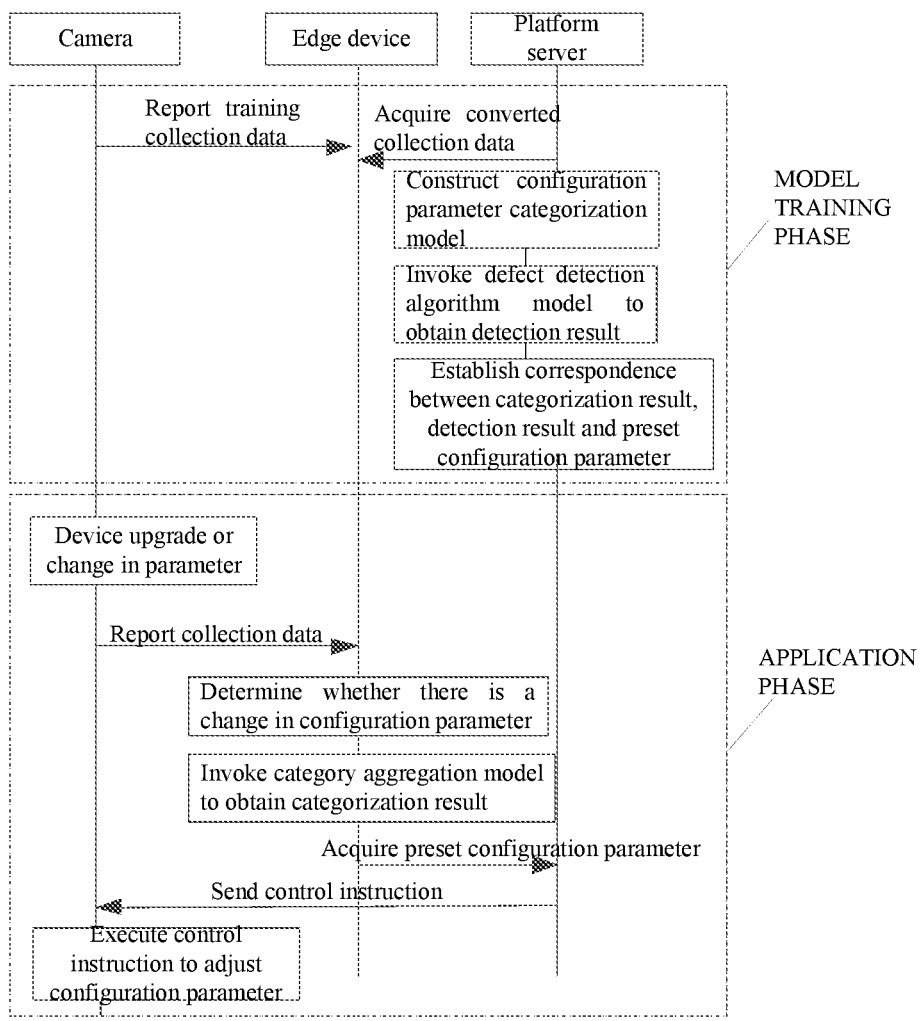
FIG. 9 shows yet another interactive process diagram of the method for device configuration parameter processing provided in the embodiments of the present application.

FIGS. 8-9 describe a system process of the method for device configuration parameter processing according to the embodiments of the present application implemented in a platform server.

As shown in FIG. 8, during the training phase, a configuration parameter categorization model may be constructed in accordance with the processing in FIG. 6 or 7. The constructed configuration parameter categorization model may be distributed to an edge device. In some embodiments, the collection data may be categorized by the edge device. In some embodiments, the collection data may be categorized by a platform server.

The platform server invokes a defect detection algorithm model constructed in advance to detect the converted collection data, obtain a detection result and a detection accuracy rate for the training data of each configuration parameter category and establish a correspondence between the defect detection algorithm model and the configuration parameter category corresponding to the detection result with the highest accuracy rate.

A rule engine service component of the edge device can identify a data index of the data reported by the collection device. A comparison module of the platform server compares the data index of the collection data with a same data index of historical collection data. When the difference between the data index of the collection data and the same data index of the historical collection data exceeds a preset threshold, the platform server determines that the reported image data has changed. Upon determination of a change, the platform server sends a control instruction to the edge device, and the edge device sends a preset configuration parameter to the collection device in the form of a control instruction.

Optionally, the change in the image data content may also be made smaller than the preset threshold by recycling the above operation in combination with adjustment of the preset configuration parameter.

For example, when the edge device identifies that the change in the data index of the reported collection data exceeds the preset threshold, it sends the collection data to the platform server.

The platform server invokes a change identification model constructed in advance to identify whether the collection data has changed. When determining that the collection data has changed, the platform server generates a control instruction according to a change ratio of the collection data and the preset configuration parameter. The platform server sends the control instruction to the edge device. The edge device sends the control instruction to the collection device.

After sending the control instruction to the collection device, the method may further comprise:

The edge device acquires the current collection data collected in accordance with the adjusted configuration parameter and determines whether a change in the data index of the current collection data exceeds a preset threshold. If so, the edge device sends the current collection data to the platform server. The platform server invokes the change identification model constructed in advance to identify whether the current collection data has changed. When the change in the current collection data is determined to be smaller than the preset threshold, the recycling finishes; and when the change in the current collection data is determined to be greater than or equal to the preset threshold, the generation of a control instruction according to the change ratio of the collection data and the preset configuration parameter is continued, and the previous steps are recycled until the change in the current collection data is smaller than the preset threshold.

During the application phase, the collection device reports the collection data to the edge device. The edge device identifies whether the device configuration parameter corresponding to the collection device has changed. When determining that the collection device has changed, the edge device notifies the platform server, and the platform server acquires a preset configuration parameter stored in it, converts the preset configuration parameter into a control instruction and sends the control instruction to the collection device.

FIG. 9 differs from FIG. 8 in that the platform server also trains a configuration parameter categorization model, and can thus perform aggregation on the categorization results that have been categorized, thereby improving the speed of categorization processing.

The platform server invokes a defect detection algorithm model constructed in advance to detect the converted collection data, obtain a detection result and an accuracy rate corresponding to the detection result, and establish a correspondence between the defect detection algorithm model and the configuration parameter corresponding to the detection result with the highest accuracy rate.

During the application phase, the collection device reports the collection data to the edge device. The edge device identifies whether the device configuration parameter corresponding to the collection device has changed. When determining that the device configuration parameter has changed, the edge device first invokes a configuration parameter categorization model acquired from the platform server to categorize the collection data and obtain a configuration parameter category, and then the edge device notifies the platform server of a change in the device configuration parameter. The platform server acquires a preset configuration parameter stored in it, converts the preset configuration parameter into a control instruction and sends the control instruction to the collection device.

Figure 10:
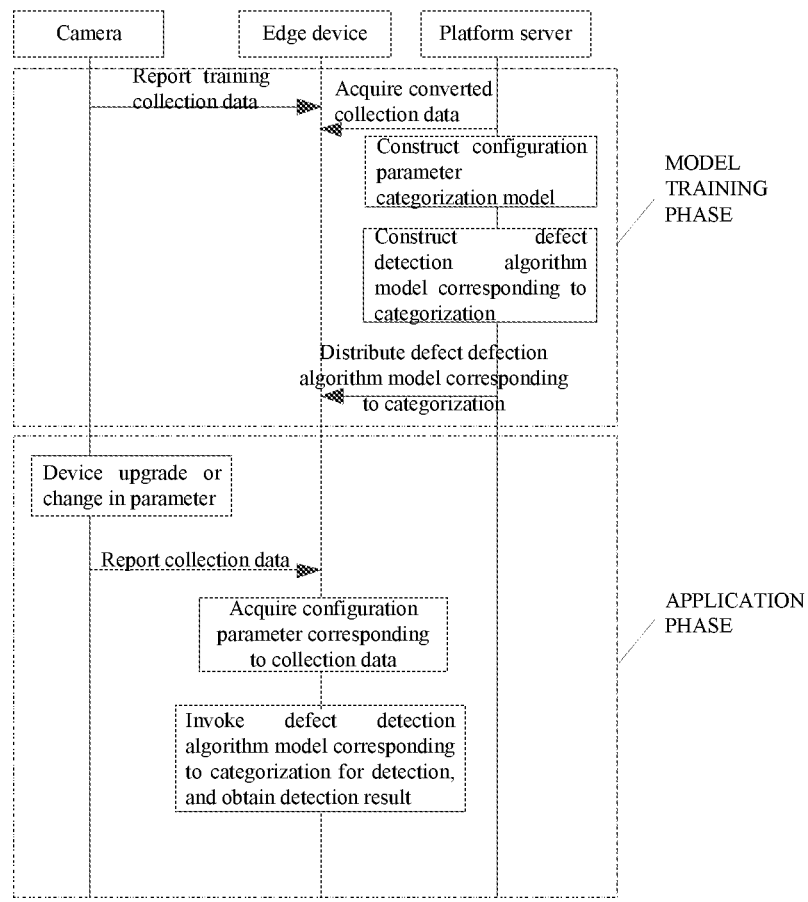
FIG. 10 shows a further interactive process diagram of the method for device configuration parameter processing provided in the embodiments of the present application.

FIG. 10 describes a system process of the method for data analysis according to the present application. During the model training phase, converted collection data is acquired from an edge device via a platform server. Optionally, a configuration parameter categorization model, or a configuration parameter category aggregation model, or a configuration parameter categorization and aggregation model is constructed. The configuration parameter categorization model may be arranged in an algorithm model component. The algorithm component may be arranged in the edge device or in the platform server.

Then a defect detection model corresponding to each configuration parameter category is constructed. The configuration parameter category may be a categorization result output after the processing of the configuration parameter categorization model or the configuration parameter category aggregation model, or a categorization result obtained from artificial categorization processing. The defect detection model may also be arranged in an algorithm model component. The algorithm component may be arranged in the edge device or in the platform server.

When the algorithm model component is arranged in the platform server, the platform server sends to the edge device the constructed defect detection algorithm model corresponding to each configuration parameter category.

During the application phase, upon receipt of collection data, the edge device acquires a configuration parameter category corresponding to the collection data and then looks up, according to the configuration parameter category, a detect detection algorithm model corresponding to the configuration parameter category for detection. This can effectively improve the accuracy rate of the detection result.

In the above embodiments, multiple different algorithm models may be constructed using the computation processing power of the platform server. It is also possible to distribute part of the algorithm models to the edge device according to the actual situations of the algorithm model construction, e.g., the configuration parameter categorization may be arranged on the edge device. The parameter category aggregation model and the defect detection algorithm model may be arranged on the platform server.

Flow charts and diagrams in the drawings illustrate possible systematic frameworks, functions and operations that can be implemented by the system, method and computer program product according to various embodiments of the present invention. In this regard, each box in the flow charts or the diagrams may represent a module, a program segment or a portion of codes, and the module, the program segment or the portion of codes comprises one or more executable instructions for implementing prescribed logic functions. It should be noted that in some alternative implementations, the functions indicated in the boxes may also be performed in a sequence different from that indicated in the drawings. For example, two consecutive boxes can actually be executed substantially concurrently, but sometimes they can also be executed in an opposite sequence, and this depends on the functions involved. It should also be noted that each box in the diagrams and/or the flow charts and a combination of the boxes in the diagrams and/or the flow charts can be implemented by means of a hardware-based system for executing the prescribed functions or operating the dedicated hardware, or by means of a combination of dedicated hardware and computer instructions.

Figure 11:
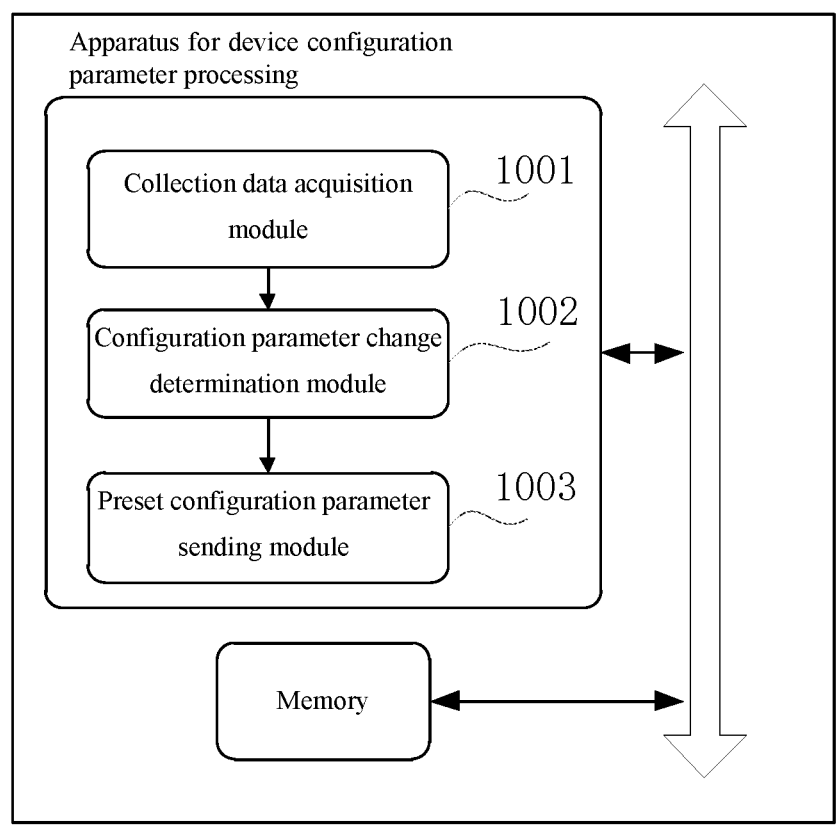
FIG. 11 shows a structure diagram of the apparatus for device configuration parameter processing provided in the embodiments of the present application.

Please further refer to FIG. 11. FIG. 11 shows a structure diagram of the apparatus for device configuration parameter processing provided in the embodiments of the present application. The apparatus for device configuration parameter processing may be arranged on an edge device or a platform server, i.e., the method described in FIG. 3 is implemented by executing a program via a memory, a processor and a computer program stored in the memory and capable of running on the processor in the edge device or the platform server. The apparatus comprises:

- A collection data acquisition module 1001 configured to acquire collection data of a collection device located at a target position, wherein the collection data is configured to be input into a content analysis model for the target position so as to obtain a content analysis result of the collection data;
- A configuration parameter change determination module 1002 configured to determine, based on the collection data, whether a current configuration parameter of the collection device has changed;
- A preset configuration parameter sending module 1003 configured to send a preset configuration parameter for the target position to the collection device in response to a change in the current configuration parameter of the collection device so as to adjust the current configuration parameter of the collection device based on the preset configuration parameter; wherein, the content analysis result output by the content analysis model has a first content analysis accuracy rate for collection data collected by the collection device configured with the preset configuration parameter, and the content analysis result output by the content analysis model has a second content analysis accuracy rate for collection data collected by the collection device configured with the current configuration parameter, the first content analysis accuracy rate being higher than the second content analysis accuracy rate.

In some embodiments, the configuration parameter change determination module 1002 is further configured to compare a same data index of the collection data and historical collection data to obtain a first comparison result, wherein the historical collection data is data acquired for the target position at a historical time temporally earlier than the data collection time; and determine, based on the first comparison result, whether the current configuration parameter of the collection device has changed.

In some embodiments, the configuration parameter change determination module 1002 is further configured to compare a same data index of the collection data and training data of the content analysis model to obtain a second comparison result, wherein the training data is data for training the content analysis model; and determine, based on the second comparison result, whether the current configuration parameter of the collection device has changed.

In some embodiments, the apparatus further comprises a preset configuration parameter determination module. The preset configuration parameter determination module is configured to: acquire historical collection data for the target position, a configuration parameter category of the collection device collecting the historical collection data, and a target content result of the historical collection data, the target content result being objective content reflected by the respective collection data; input the historical collection data corresponding to each configuration parameter category into the content analysis model to obtain a content analysis result of the historical collection data corresponding to each configuration parameter category; determine a content analysis accuracy rate of the content analysis model for the historical collection data of each configuration parameter category based on the content analysis result and the target content result of the historical collection data corresponding to each configuration parameter category; and determine the configuration parameter category corresponding to the highest content analysis accuracy rate as the preset configuration parameter category.

In some embodiments, the configuration parameter change determination module 1002 is further configured to input the collection data into a configuration parameter categorization model to obtain a current configuration parameter category of the collection device; determine whether the current configuration parameter category of the collection device is a preset configuration parameter category; determine, in response to the current configuration parameter category of the collection device not being the preset configuration parameter category, that the current configuration parameter of the collection device has changed. Moreover, the preset configuration parameter sending module 1003 is configured to send a preset configuration parameter corresponding to the preset configuration parameter category to the collection device.

In some embodiments, the apparatus further comprises a configuration parameter categorization model construction module, configured to acquire historical collection data for the target position and a configuration parameter category of the collection device collecting the historical collection data; and perform model training using the historical collection data as a sample and the configuration parameter category of the collection device collecting the historical collection data as a label so as to obtain the configuration parameter categorization model. The configuration parameter categorization model construction module may also be configured to input, after acquiring the configuration parameter category of the collection device collecting the historical collection data, the configuration parameter category of the collection device collecting the historical collection data into a configuration parameter category aggregation model to obtain an aggregated configuration parameter category; and perform model training using the historical collection data as a sample and the aggregated configuration parameter category as a label so as to obtain the configuration parameter categorization model.

In some embodiments, the apparatus further comprises a content analysis model construction module configured to acquire historical collection data for the target position and a target content result of the historical collection data, the target content result being objective content reflected by the respective collection data; and perform model training using the historical collection data as a sample and the target content result of the historical collection data as a label so as to obtain the content analysis model.

Figure 12:
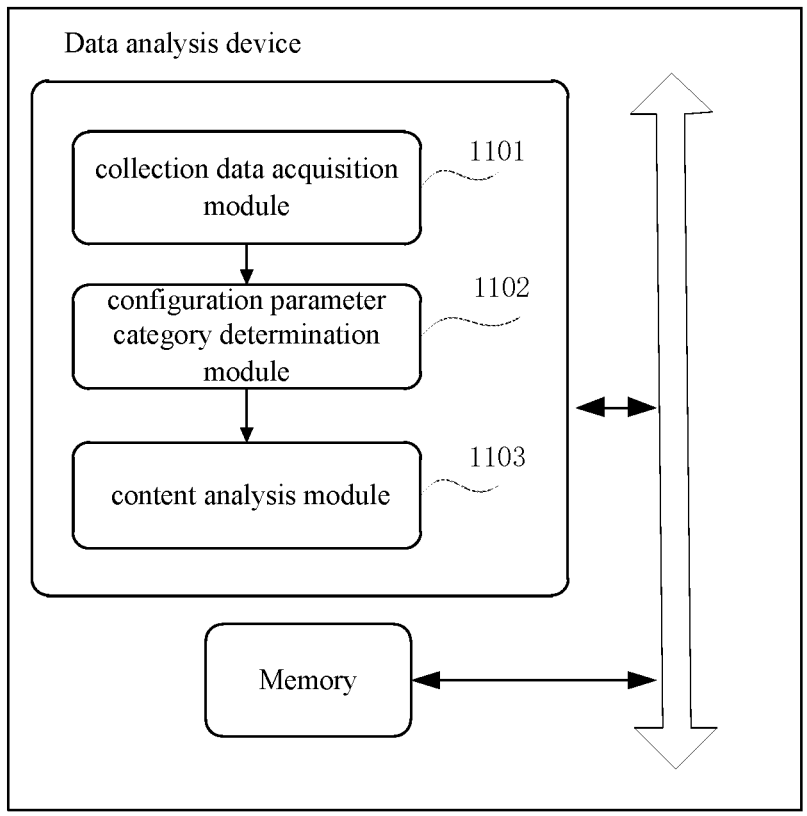
FIG. 12 shows a structure diagram of the apparatus for data analysis provided in the embodiments of the present application.

Please refer to FIG. 12. FIG. 12 shows a structure diagram of the apparatus for data analysis provided in the embodiments of the present application. The apparatus for data analysis may be arranged on an edge device or a platform server, i.e., the method described in FIG. 5 is implemented by executing a program via a memory, a processor and a computer program stored in the memory and capable of running on the processor in the edge device or the platform server. The apparatus comprises:

A collection data acquisition module 1101 configured to acquire collection data of a collection device located at a target position;

A configuration parameter category determination module 1102 configured to input the collection data into a configuration parameter categorization model to obtain a configuration parameter category of the collection device;

A content analysis module 1103 configured to input the collection data into a content analysis model corresponding to the configuration parameter category of the collection device so as to obtain a content analysis result of the collection data. Based on the above embodiments, the problem of low utilization of single algorithm models caused by multiple training of the single algorithm models is solved by configuring multiple algorithm models in advance.

Figure 13:
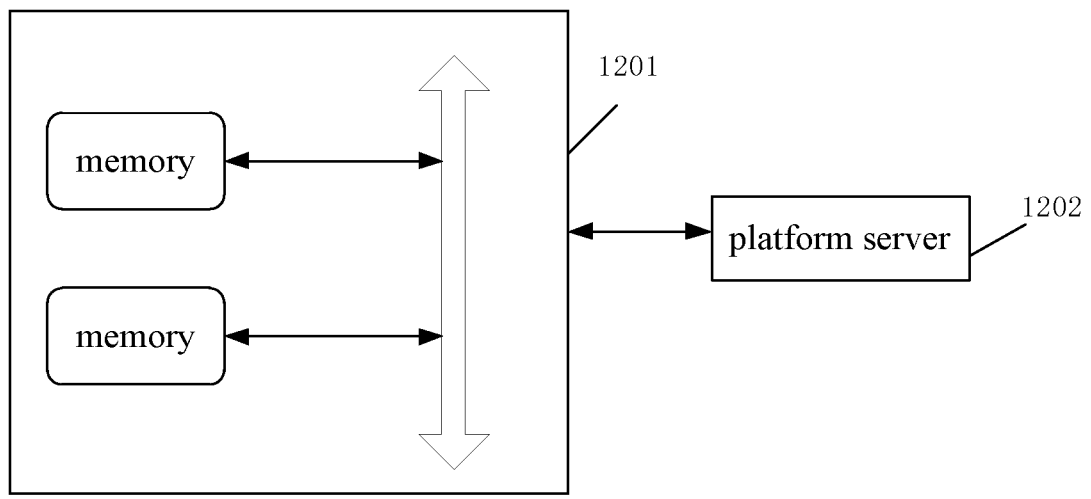
FIG. 13 shows a structure diagram of the computing device provided in the embodiments of the present application.

Based on the embodiments mentioned above, the embodiments of the present application further propose a computing device. FIG. 13 shows a structure diagram of the computing device provided in the embodiments of the present application. The system comprises: an edge device 1201 and a platform server 1202 described in FIG. 11 or 12, communication connection is established between the edge device and the platform server, and the platform server 1202 is configured to provide to the edge device an algorithm model and a parameter categorization model constructed in advance.

Figure 14:
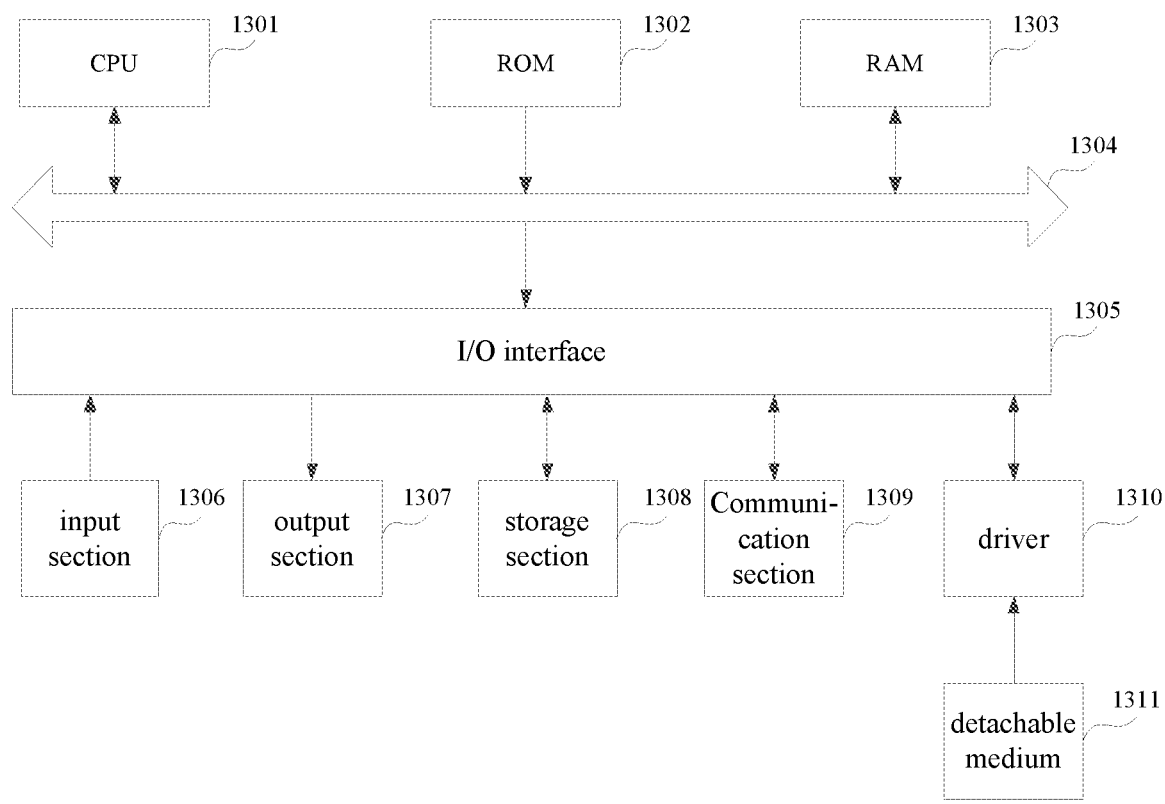
FIG. 14 shows a structure diagram of a computer system of devices or servers provided in the embodiments of the present application.

Referring to FIG. 14, FIG. 14 shows a structure diagram of a computer system of devices or servers provided in the embodiments of the present application.

As shown in FIG. 14, the computer system comprises a central processing unit (CPU) 1301, which can perform various appropriate actions and processing based on programs stored in read-only memory (ROM) 1302 or programs loaded from storage section 908 into random access memory (RAM) 1303. In the RAM 1303, various programs and data required for system operation are also stored. The CPU 1301, the ROM 1302, and the RAM 1303 are connected to each other through bus 1304. Input/output (I/O) interface 1305 is also connected to the bus 1304.

The following components are connected to the I/O interface 1305: an input section 1306 including a keyboard, a mouse, etc.; an output section 1307 including a cathode ray tube (CRT), a liquid crystal display (LCD), a speaker, etc.; a storage section 1308 including a hard disk and so on; and a communication section 1309 including a network interface card such as a LAN card, a modems, etc. The communication section 1309 performs communication processing via a network such as the Internet. A driver 1310 is also connected to the I/O interface 1305 as needed. A detachable medium 1311 such as a magnetic disk, an optical disk, a magneto optical disc and a semiconductor memory is installed on the driver 1310 as needed so as to facilitate the installation of a computer program read out therefrom into the storage section 1308 as needed.

In particular, according to embodiments of this disclosure, the process described with reference to the flow chart in FIG. 3 or 5 may be implemented as a computer software program. For example, an embodiment of this disclosure comprises a computer program product comprising a computer program carried on a machine-readable medium, and the computer program comprises program codes for executing the method shown in the flow chart. In such an embodiment, the computer program may be downloaded and installed from a network via the communication section 1309, and/or installed from the detachable medium 1311. When executed by the central processing unit (CPU) 1301, the computer program performs the above function defined by the system of the present application.

It should be noted that the computer-readable medium disclosed in this disclosure may be a computer-readable signal medium or a computer-readable storage medium or any combination of both of them. The computer-readable storage medium may comprise but is not limited to, for example, electrical, magnetic, optical, electromagnetic, infrared, or semiconductor systems, apparatuses, or devices, or any combination of the above. More specific examples of the computer-readable storage medium may comprise but are not limited to: electrical connections with one or more wires, portable computer disks, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any suitable combination of the above. In this disclosure, the computer-readable storage medium may be any tangible medium that contains or stores a program, which can be used by or in combination with an instruction execution system, apparatus, or device. In this disclosure, the computer-readable signal medium may comprise data signals propagated in a baseband or as part of a carrier wave, which carry computer-readable program codes. The propagated data signal may adopt many forms, including but not limited to electromagnetic signals, optical signals, or any suitable combination of the above. The computer-readable signal medium may also be any computer-readable medium other than a computer-readable storage medium, which computer-readable medium may send, propagate or transmit programs to be used by or in combination with an instruction execution system, apparatus or device. The program code contained on the computer-readable medium may be transmitted using any suitable medium, including but not limited to: wireless, wire, optical cable, RF, etc., or any suitable combination of the above.

The present application further provides a computer program product or computer program. The computer program product or computer program comprises computer instructions. The computer instructions are stored in a computer-readable storage medium. The computer instructions are read out from the computer-readable storage medium by a processor of a computing device. The processor executes the computer instructions such that the computing device performs the method for device configuration parameter processing and the method for data analysis provided in various optional implementations mentioned above.

Flow charts and diagrams in the drawings illustrate possible systematic frameworks, functions and operations that can be implemented by the system, method and computer program product according to various embodiments of this disclosure. In this regard, each box in the flow charts or the diagrams may represent a module, a program segment or a portion of codes, and the module, the program segment or the portion of codes comprises one or more executable instructions for implementing prescribed logic functions. It should be noted that in some alternative implementations, the functions indicated in the boxes may also be performed in a sequence different from that indicated in the drawings. For example, two consecutive boxes can actually be executed substantially concurrently, but sometimes they can also be executed in an opposite sequence, and this depends on the functions involved. It should also be noted that each box in the diagrams and/or the flow charts and a combination of the boxes in the diagrams and/or the flow charts can be implemented by means of a hardware-based system for executing the prescribed functions or operating the dedicated hardware, or by means of a combination of dedicated hardware and computer instructions.

The units or modules described in the embodiments of the present application may be implemented by either software or hardware. The described units or modules may also be arranged in a processor, which for example may be described as: a processor comprising a first collection data acquisition unit, a determination unit, a parameter acquisition unit and a sending unit. The terms of these units or modules do not constitute a limitation on the units or modules themselves in certain situations. For example, a business subscription module may also be described as "a unit for obtaining collection data reported by a collection device located at the target location".

On the other hand, the present application further provides a computer-readable storage medium which may either be contained in an electronic device described in the above embodiments or exist separately without being assembled into the electronic device. The computer-readable storage medium has one or more programs stored thereon, which are executed by one or more processors to perform the method for device configuration parameter processing described in the present application.

The above depictions are only explanations of the preferred embodiments of the present application and the technical principles employed. Those skilled in the art should understand that the inventive scope of the present application is not limited by the technical solutions formed by a specific combination of the above technical features, but instead, it should also cover other technical solutions formed by a random combination of the above technical feature or equivalent features without deviating from the inventive concept, for example, technical solutions formed by replacing the above features with technical features having similar functions as disclosed in the present application (but not limited thereto).

We claim:

1. A method for device configuration parameter processing, comprising:
   acquiring collection data of a collection device located at a target position, wherein the collection data is configured to be input into a content analysis model for the target position so as to obtain a content analysis result of the collection data;
   determining, based on the collection data, whether a current configuration parameter of the collection device has changed; and
   sending, in response to the current configuration parameter of the collection device having changed, a preset configuration parameter for the target position to the collection device so as to adjust the current configuration parameter of the collection device based on the preset configuration parameter;
   wherein in a case that an input into the content analysis model is the collection data of the collection device configured with the preset configuration parameter, the content analysis result output by the content analysis model has a first content analysis accuracy rate, and in a case that the input into the content analysis model is the collection data of the collection device configured with the current configuration parameter, the content analysis result output by the content analysis model has a second content analysis accuracy rate, and
   wherein the first content analysis accuracy rate is higher than the second content analysis accuracy rate,
   wherein determining, based on the collection data, whether the current configuration parameter of the collection device has changed comprises:
      inputting the collection data into a configuration parameter categorization model to obtain a current configuration parameter category of the collection device;
      determining whether the current configuration parameter category of the collection device is a preset configuration parameter category;
      determining, in response to the current configuration parameter category of the collection device not being the preset configuration parameter category, that the current configuration parameter of the collection device has changed; and,
   wherein sending the preset configuration parameter for the target position to the collection device comprises:
      sending the preset configuration parameter corresponding to the preset configuration parameter category to the collection device,
   wherein the method further comprises:
      acquiring first historical collection data for the target position and the current configuration parameter category of the collection device collecting the first historical collection data; and
      performing model training using the first historical collection data as a sample and the current configuration parameter category of the collection device collecting the first historical collection data as a label so as to obtain the configuration parameter categorization model.

2. The method according to claim 1, wherein determining, based on the collection data, whether the current configuration parameter of the collection device has changed comprises:
   comparing a same data index of the collection data and historical collection data to obtain a first comparison result, wherein the historical collection data is data acquired for the target position at a historical time, wherein the historical time is temporally earlier than a data collection time, and the data index is an index of the collection data varying with a configuration parameter of the collection device; and
   determining, based on the first comparison result, whether the current configuration parameter of the collection device has changed.

3. The method according to claim 1, wherein determining, based on the collection data, whether the current configuration parameter of the collection device has changed comprises:
   comparing a same data index of the collection data and training data of the content analysis model to obtain a second comparison result, wherein the training data is data for training the content analysis model, and the data index is an index of the collection data varying with a configuration parameter of the collection device; and
   determining, based on the second comparison result, whether the current configuration parameter of the collection device has changed.

4. The method according to claim 1, wherein the collection data comprises a current device identifier of the collection device, and determining, based on the collection data, whether the
current configuration parameter of the collection device
has changed comprises:
identifying a device identifier of the collection device
from the collection data; and
determining, based on the device identifier of the collection data and a historical device identifier of the target position, whether the current configuration parameter of the collection device has changed.

5. The method according to claim 1, further comprising:
after acquiring the collection data of the collection device located at the target position, performing data format conversion on the collection data.

6. The method according to claim 1, further comprising:
after acquiring the current configuration parameter category of the collection device collecting the first historical collection data, inputting the current configuration parameter category of the collection device collecting the first historical collection data into a configuration parameter category aggregation model to obtain an aggregated configuration parameter category; and,
performing model training using the first historical collection data as the sample and the current configuration parameter category of the collection device collecting the first historical collection data as the label comprises:
performing model training using the first historical collection data as a sample and the aggregated configuration parameter category as the label so as to obtain the configuration parameter categorization model.

7. The method according to claim 1, further comprising:
acquiring second historical collection data for the target position, a configuration parameter category of the collection device collecting the second historical collection data, and a target content result of the second historical collection data, wherein the target content result is an objective content reflected by the second historical collection data;
inputting the second historical collection data corresponding to each configuration parameter category into the content analysis model to obtain the content analysis result of the second historical collection data corresponding to each configuration parameter category;
determining the content analysis accuracy rate of the content analysis model for the second historical collection data of each configuration parameter category based on the content analysis result and the target content result of the second historical collection data corresponding to each configuration parameter category; and
determining the configuration parameter category corresponding to a highest content analysis accuracy rate as the preset configuration parameter category.

8. The method according to claim 1, further comprising:
acquiring third historical collection data for the target position and a target content result of the third historical collection data, wherein the target content result is an objective content reflected by the third historical collection data; and
performing model training using the third historical collection data as a sample and the target content result of the third historical collection data as a label so as to obtain the content analysis model.

9. The method according to claim 1, wherein the method is performed by an edge device comprising a rule engine service component and a device remote control service component, and
determining, based on the collection data, whether the current configuration parameter of the collection device has changed is performed by the rule engine service component, and
sending the preset configuration parameter for the target position to the collection device is performed by the device remote control service component.

10. The method according to claim 1, wherein the method is performed by an edge device and a platform server, and
determining, based on the collection data, whether the current configuration parameter of the collection device has changed is performed by the edge device, and
sending the preset configuration parameter for the target position to the collection device is performed by the platform server.

11. A computing device, comprising:
a memory configured to store a computer-executable instruction; and
a processor configured to implement the method according to claim 1 when the computer-executable instruction is executed by the processor.

12. A non-transitory computer-readable storage medium, having a computer-executable instruction stored thereon, wherein the computer-executable instruction implements the method according to claim 1 when the computer-executable instruction is executed.

13. A computer program product comprising a computer-executable instruction, wherein the computer-executable instruction implements the method according to claim 1 when executed by a processor.

14. An apparatus for device configuration parameter processing, comprising:
a collection data acquisition module configured to acquire collection data of a collection device located at a target position, wherein the collection data is configured to be input into a content analysis model for the target position so as to obtain a content analysis result of the collection data;
a configuration parameter change determination module configured to determine, based on the collection data, whether a current configuration parameter of the collection device has changed; and
a preset configuration parameter sending module configured to send, in response to the current configuration parameter of the collection device having changed, a preset configuration parameter for the target position to the collection device so as to adjust the current configuration parameter of the collection device based on the preset configuration parameter; wherein in a case that the input into the content analysis model is the collection data of the collection device configured with the preset configuration parameter, the content analysis result output by the content analysis model has a first content analysis accuracy rate, and in a case that the input into the content analysis model is the collection data of the collection device configured with the current configuration parameter, the content analysis result output by the content analysis model has a second content analysis accuracy rate,
wherein the first content analysis accuracy rate is higher than the second content analysis accuracy rate,
wherein the configuration parameter change determination module is further configured to:

input the collection data into a configuration parameter categorization model to obtain a current configuration parameter category of the collection device;

determine whether the current configuration parameter category of the collection device is a preset configuration parameter category;

determine, in response to the current configuration parameter category of the collection device not being the preset configuration parameter category, that the current configuration parameter of the collection device has changed; and, wherein the preset configuration parameter sending module is further configured to:

send the preset configuration parameter corresponding to the preset configuration parameter category to the collection device, wherein the preset configuration parameter sending module is further configured to:

acquire first historical collection data for the target position and the current configuration parameter category of the collection device collecting the first historical collection data; and perform model training using the first historical collection data as a sample and the current configuration parameter category of the collection device collecting the first historical collection data as a label so as to obtain the configuration parameter categorization model.

* * * * *